United States Patent [19]
Schmucker et al.

[11] Patent Number: 5,991,461
[45] Date of Patent: Nov. 23, 1999

[54] SELECTION PROCESS FOR SEQUENTIALLY COMBINING MULTIPLE SETS OF OVERLAPPING SURFACE-PROFILE INTERFEROMETRIC DATA TO PRODUCE A CONTINUOUS COMPOSITE MAP

[75] Inventors: Mark A. Schmucker; Joanna Schmit, both of Tucson, Ariz.

[73] Assignee: Veeco Corporation, Tucson, Ariz.

[21] Appl. No.: 08/992,310

[22] Filed: Dec. 17, 1997

Related U.S. Application Data

[63] Continuation-in-part of application No. 08/771,428, Dec. 20, 1996.

[51] Int. Cl.⁶ ..................................... G06K 9/36
[52] U.S. Cl. .......................... 382/284; 382/108; 382/154; 382/286; 356/376; 356/345; 356/356; 356/359; 345/419; 345/425; 348/47; 348/48; 348/94
[58] Field of Search .................................... 382/284, 154, 382/108, 286; 356/376, 345, 356, 359; 345/425, 419; 348/47, 48, 94

[56] References Cited

U.S. PATENT DOCUMENTS

| | | | |
|---|---|---|---|
| 717,782 | 2/1903 | Debbeau, Jr. ........................... | 382/154 |
| 4,869,593 | 9/1989 | Biegen ..................................... | 356/351 |
| 5,436,462 | 7/1995 | Hull-Allen .............................. | 250/550 |
| 5,555,471 | 9/1996 | Xu et al. ................................. | 356/357 |
| 5,623,561 | 4/1997 | Hartman .................................. | 385/12 |
| 5,710,631 | 1/1998 | Bou-Ghannam et al. .............. | 356/351 |
| 5,712,890 | 1/1998 | Spivey et al. ........................... | 378/37 |

Primary Examiner—Jose L. Couso
Assistant Examiner—Kanji Patel
Attorney, Agent, or Firm—Antonio R. Durando

[57] ABSTRACT

The process of combining various sets of measured data is carried out by first selecting a section of the test surface and its data set as the starting point and comparing the regions of overlap with adjacent sections of the test sample. All pixels containing an invalid data point in at least one of the data sets of each overlapping region are eliminated from consideration and the remaining valid pixels are counted. Then the adjacent section having an overlapping region with the largest number of valid pixels is selected for combination with the first section and their data sets are fitted according to a predetermined procedure, thereby producing an enlarged composite set of corrected data. The process is then repeated by comparing the overlapping regions of all sets adjacent to the composite section to determine the one having the largest number of pixels with valid data points. That set is then fitted to the existing composite profile to produce a new composite set of corrected data. These steps are repeated until the measured data corresponding to all sections are corrected and combined to produce a single uniform map of the sample surface.

16 Claims, 28 Drawing Sheets

FIT A PLANE EQUATION THROUGH THE MEASURED HEIGHTS IN SECTION 3 CORRESPONDING TO THE REGION OF OVERLAP WITH SECTION 2, $\underline{H}_{3,2}(x,y)$, TO OBTAIN A CURRENT PLANE EQUATION
$$z_{3,2}(x,y) = a_{3,2} + b_{3,2}x + c_{3,2}y$$

FOR EACH PIXEL IN SECTION 3, CALCULATE A CORRECTED HEIGHT $h_3'(x,y) = h_3(x,y) + z_{2,3}(x,y) - z_{3,2}(x,y)$

REPEAT THE LAST THREE STEPS FOR ALL THE SECTIONS IN THE TEST AREA BY SEQUENTIALLY FITTING A PLANE EQUATION THROUGH THE CORRECTED HEIGHTS IN SECTION n CORRESPONDING TO THE REGION OF OVERLAP WITH SECTION n+1, $\underline{H}'_{n,n+1}(x,y)$, TO OBTAIN A CURRENT REFERENCE PLANE EQUATION
$$z_{n,n+1}(x,y) = a_{n,n+1} + b_{n,n+1}x + c_{n,n+1}y,$$

FITTING A PLANE EQUATION THROUGH THE MEASURED HEIGHTS IN SECTION n+1 CORRESPONDING TO THE REGION OF OVERLAP WITH SECTION n, $\underline{H}_{n+1,n}(x,y)$, TO OBTAIN A CURRENT CORRECTION PLANE EQUATION
$$z_{n+1,n}(x,y) = a_{n+1,n} + b_{n+1,n}x + c_{n+1,n}y,$$

AND CALCULATING A CORRECTED HEIGHT
$h'_{n+1}(x,y) = h_{n+1}(x,y) + z_{n,n+1}(x,y) - z_{n+1,n}(x,y)$
FOR EACH PIXEL IN SECTION n+1, AND FOR ALL n, $3 \leq n \leq t-1$

FIG. 3B

COMBINE THE MEASURED HEIGHT DATA OF SUCH ADJACENT SECTION WITH THE COMPOSITE SET OF CORRECTED HEIGHT DATA BY A STITCHING PROCEDURE, THEREBY PRODUCING AN EXPANDED COMPOSITE SET OF CORRECTED HEIGHT DATA FOR A CORRESPONDING EXPANDED COMPOSITE SECTION OF THE TEST SURFACE.

REPEAT THE LAST THREE STEPS UNTIL ALL OF THE PLURALITY OF MEASURED SETS OF HEIGHT DATA HAVE BEEN COMBINED TO PRODUCE A COMPOSITE PROFILE OF THE TEST SURFACE.

FIG. 20B

SELECTION PROCESS FOR SEQUENTIALLY COMBINING MULTIPLE SETS OF OVERLAPPING SURFACE-PROFILE INTERFEROMETRIC DATA TO PRODUCE A CONTINUOUS COMPOSITE MAP

RELATED APPLICATIONS

This application is a continuation-in-part application of copending U.S. Ser. No. 08/771,428, filed on Dec. 20, 1996.

BACKGROUND OF THE INVENTION

1. Field of the Invention

This invention pertains to the general field of interferometric profilometry. In particular, it provides a technique for improving the resolution of an interferometric profilometer by reducing the field of view of its objective and combining multiple overlapping images in an optimal sequential process to form a composite profile.

2. Description of the Prior Art

The optical resolution of the objective of an interferometer is an important parameter in the overall performance of the instrument. The spatial resolution can be enhanced by reducing the field of view of the objective, but that also reduces the capability of the instrument with respect to the area of sample being tested. If, on the other hand, the field of view is enlarged to cover a larger test surface, the optical (and therefore also spatial) resolution of the resulting image is adversely affected. Therefore, a practical balance is normally struck between the optical resolution of the profilometer and the size of the test surface that it can handle.

As interferometric technology progresses, it has become very desirable to provide some flexibility with regard to the surface size of the samples suitable for testing. This invention provides an optimal procedure for enhancing the resolution or, alternatively, for increasing the x-y profiling range of a conventional interferometer.

BRIEF SUMMARY OF THE INVENTION

It is therefore an objective of this invention to provide a procedure that effectively increases the field of view of a given interferometric profiler without modifications to its optics.

Another object of the invention is a procedure for increasing the field of view of a given interferometric profiler without affecting its optical resolution.

Another objective of the invention is a computationally efficient method to achieve the above goals, so that computer processing time is minimized.

Another goal of the invention is a method that is computationally stable, repeatable and consistent with measured data.

A further objective of the invention is a procedure capable of implementation in real time for on-line applications.

Still another objective of the invention is a systematic procedure for sequentially combining measured data sets for adjacent sections of a test surface to produce an accurate composite profile.

Another goal of the invention is its general application to increasing the x-y scanning range of conventional interferometric profilers without limitation to any specific field of testing.

Finally, another goal is the realization of the above mentioned objectives in a system that can be implemented with existing sensory, computing, and other hardware devices.

In accordance with these and other objectives, the preferred embodiment of the method and apparatus of this invention consists of taking successive measurements of adjacent sections of the surface of a test sample by sequentially placing them within the field of view of the instrument and independently profiling each section by phase shifting or vertical scanning interferometry. The x-y translation of the microscope between successive measurements from one section to the next adjacent section of the surface being profiled is carried out by maintaining a region of overlap between sections, so that spatial continuity is retained between measurements. The height data generated for each section are then combined to form a larger image corresponding to the entire surface tested and discontinuities and/or errors introduced by the x-y translation process are corrected by normalizing the overlapping portions to a common reference plane.

According to one aspect of the invention, a plane is fitted through each set of measured heights in the overlapping regions and the tip, tilt and offset of one of the fitted planes are corrected to produce matching overlapping height data in adjacent sections. The measured height data for the balance of each section are then also corrected by the same difference in tip, tilt and offset to obtain a continuous normalized image.

According to another aspect of the invention, the process of combining the various sets of measured data is carried out by first selecting a section of the test surface and its data set as the starting point and comparing the regions of overlap with adjacent sections of the test sample. All pixels containing an invalid data point in at least one of the data sets of each overlapping region are eliminated from consideration and the remaining valid pixels are counted. Then the adjacent section having an overlapping region with the largest number of valid pixels is selected for combination with the first section and their data sets are fitted according to the procedure outlined above, thereby producing an enlarged composite set or profile of corrected data. The process is then repeated by comparing the overlapping regions of all sets adjacent to the composite section to determine the one having the largest number of pixels with valid data points. That set is then fitted to the existing composite profile to produce a new composite set of corrected data. These steps are repeated until the measured data corresponding to all sections are corrected and combined to produce a single uniform map of the sample surface.

Various other purposes and advantages of the invention will become clear from its description in the specification that follows, and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose only some of the various ways in which the invention may be practiced.

DETAILED DESCRIPTION OF THE INVENTION

Figure 1:
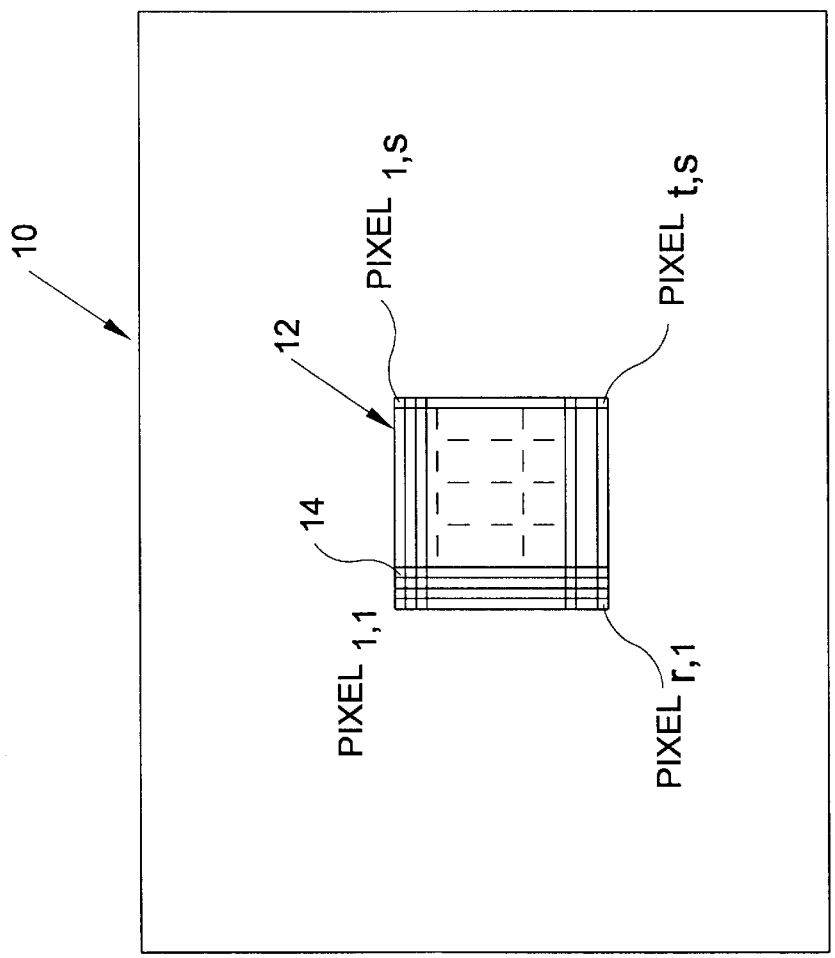
FIG. 1 illustrates in schematic view a test surface being measured by interferometric apparatus having an optical objective with a field of view smaller than the test surface, where the field of view is shown subdivided into rows and columns defining pixels corresponding to the cells of the light detector.

The method of this invention is directed at optimizing the meshing of overlapping height-profile data acquired by interferometric measurements carried out according to conventional procedures and apparatus. When multiple sets of data are acquired by profiling adjacent sections of the surface being profiled, the combination of such sets of data to form a larger composite image corresponding to the entire surface is complicated by the need for correction of misalignments and corresponding errors introduced during the x-y translation of the scanning mechanism in the interferometer. These misalignments result in height data sets based on different reference planes; therefore, the overlapping portions of adjacent sections do not normally produce consistent height data. This invention describes a process for normalizing the data to a common reference surface, such that the heights measured for overlapping portions of adjacent sections are equalized and all data sets may be combined to form an accurate composite profile. The invention also provides a systematic approach to the order of combination of the multiple data sets acquired to profile the sample surface.

It is noted that the embodiments of the present invention are described with reference to x, y and z orthogonal coordinates wherein x and y define a horizontal plane substantially parallel to the surface of the sample being tested and z defines a vertical direction of white-light (VSI) or phase-shifting (PSI) scanning, but it is obvious that the structure and operation of the features detailed herein could be rotated in any direction with equivalent results. Accordingly, reference to x-y translation corresponds to the very fine movement (on the order of several microns or millimeters, with control within less than 1 ηm) of the optics of the interferometer in the plane of the test surface to position the optics over the desired target area on the surface of the sample, which is a very exact operation that requires precision instrumentation and mechanisms.

For purposes of definition, the term "stitching" is used in this disclosure to refer to the process of combining two data sets corresponding to two overlapping sections of the surface being profiled in order to obtain a larger uniform composite set. The terms "composite set" and "composite profile" are used during the process of combining multiple data sets to refer to the set of data points comprising all sets corrected and stitched according to the invention up to that point in the process. Similarly, the term "composite section" is used to refer to the combined sections of the region of the surface being profiled corresponding to the composite set of data stitched from the beginning to that stage in the process.

According to conventional profiling methods, the section of surface being tested is subdivided into an array of pixels corresponding to detector cells in the sensory apparatus. Thus, an array of height data is generated wherein each data point represents the height of a small region or pixel of a two-dimensional target area. The data array constitutes a map of the height as measured at each pixel throughout the target area.

Figure 2:
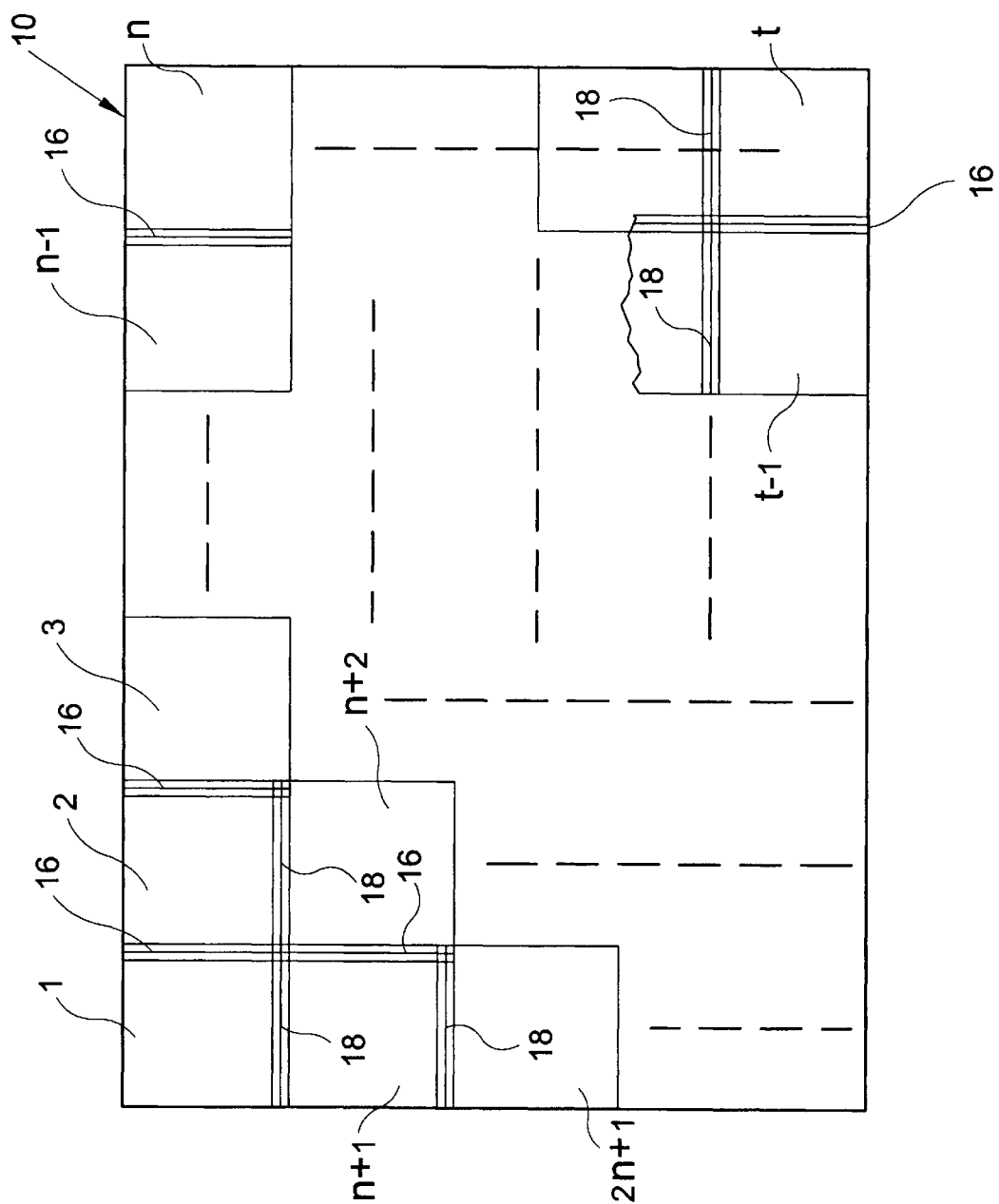
FIG. 2 illustrates the steps of the invention related to the x-y translation of the objective to measure multiple overlapping sections of the test surface.

According to a first aspect of the invention, the procedure requires that multiple sets of measurements be carried out, each set corresponding to a different target section on the surface of the test sample. Referring to the drawings, wherein like parts are designated throughout with like numerals and symbols, FIG. 1 illustrates in schematic view a test surface 10 being measured by interferometric apparatus having optics set with a field of view (smaller than the surface 10) equal to the area 12 subdivided into r rows and n columns (for example) of individual pixels 14. According to the method of the invention, the objective of the interferometer is positioned over a predetermined first section 1 of the surface 10 at known x-y coordinates, as illustrated in FIG. 2, and the section is scanned either by VSI or PSI to generate a first height map $H_1(x,y) = \{h_1(1,1), h_1(1,2), h_1(1,3), \ldots h_1(r,s)\}$ according to conventional interferometric procedures. It is noted that all such procedures involve the adjustment and measurement of the tip and tilt of the tested surface with respect to a predetermined reference plane, so that the measured height profile is relative to that plane.

The objective of the interferometer is then translated in the x-y plane to a different section 2 of known x-y coordinates. The new coordinates are selected to provide a region 16 of overlap with the first section 1. The overlap 16 is illustrated in FIG. 2 as two columns, but differently-shaped common regions would be equivalently suitable to practice the invention. As one skilled in the art would know, the particular geometry of the overlapping region would preferably depend on the arrangement of the pixels (normally an x-y array) in the light detecting apparatus. The critical consideration is that the region of overlap must be such as to provide sufficient data points to fit a plane equation through them. Section 2 is then scanned to generate a second height map $H_2(x,y)=\{h_2(1,1), h_2(1,2), h_2(1,3), \ldots h_2(r,s)\}$.

The procedure is repeated to cover the entire surface 10 intended for testing. At each x-y translation of the objective from one section to another, the new position is selected according to predetermined coordinates that ensure an appropriate overlap region with at least one adjacent section (such as two rows or two columns, for example; note that one row and one column with two adjacent sections would also suffice because of adequate data to fit a plane equation through them). The illustration of FIG. 2 shows row overlaps 18 as well as column overlaps 16, but the exact nature and extent of the overlaps is not critical to the stitching aspect of the invention, so long as the exact pixels (i.e., exact x-y coordinates) corresponding to overlapping regions between pairs of measured sections are exactly known (within a spatial tolerance deemed acceptable).

Thus, the procedure is carried out sequentially until multiple sets of height data are generated as required to cover the entire test surface 10. FIG. 2 shows t sets of measurements for illustration purposes. Accordingly, the example of FIG. 2 would produce t sets of height data $[H_1(x,y)$ through $H_t(x,y)]$.

The heart of the present invention concerns the process of normalizing and combining these height data to produce a smooth and accurate composite profile. Therefore, according to another aspect of the invention, the height data of overlapping regions of each pair of adjacent sections are fitted by conventional numerical methods (such as least squares) to produce plane functions representing each overlapping region. Considering sections n and n+1, for example, the height data in the overlapping region of section n [designated as $H_{\underline{n},n+1}(x,y)$, where the underlined notation is used to indicate a region of overlap; the first subscript n denotes the section and overlap region being fitted; and the second subscript n+1 denotes the adjacent overlapping section] are used to produce a corresponding plane equation $f_{n,n+1}(x,y)=z_{n,n+1}=a_{n,n+1}+b_{n,n+a}x+c_{n,n+1}y$, where a, b and c are the coefficients of the plane equation. Similarly, the overlapping region data of section n+1, $H_{\underline{n+1},n}(x,y)$, are used to produce the plane equation $f_{n+1,n}(x,y)=z_{n+1,n}=a_{n+1,n}+b_{n+1,n}x+c_{n+1,n}y$. Based on the equations so derived, the tip, tilt and offset of the plane n+1 with respect to plane n (or viceversa, if preferred) can be calculated and used to mesh the two overlapping regions into a single plane.

As one skilled in the art would readily recognize, the equation coefficients b and c of the plane equations are a measure of tip and tilt, respectively, and the difference in the a coefficient is a measure of the vertical offset between planes. Therefore, these calculated coefficients provide a readily available tool for calculating tip and tilt differences and offsets between overlapping equations and for meshing overlapping regions of adjacent sections.

The preferred procedure involves selecting a section of the tested surface 10 as the "reference section" and its corresponding set of height data as the "reference set" for normalization of all data sets. A plane equation is fitted to the height data of the region in the reference set overlapping an adjacent section [for example, $z_{1,2}(x,y)=a_{1,2}+b_{1,2}x+c_{1,2}y$, corresponding to a plane equation fitted through the section-1 region of data overlapping section 2]. Then the measured height data in the overlapping region of adjacent section 2 are also fitted to produce a corresponding plane equation $z_{2,1}(x,y)=a_{2,1}+b_{2,1}x+c_{2,1}y$. The differences in tip, tilt and vertical elevation between these two plane equations are calculated and used to produce matching plane equations with uniform tip and tilt and with no offset.

Assuming, for example, that $b_{1,2}=0.04'$ of a degree and $b_{2,1}=0.03'$, the difference $(0.03-0.4=-0.01)$ between the coefficients of the section-2 equation and the section-1 equation (the "reference plane") would be subtracted from $b_{2,1}$ to produce the same tip for the latter equation $[0.03-(-0.01)=0.04]$. Similarly, assuming, for example, that $c_{1,2}=0.01'$ and $c_{2,1}=0.02'$, the difference $(0.02-0.01=+0.01)$ would be subtracted from $c_{2,1}$ to produce the same tilt $(0.02-0.01=0.01)$. Finally, any vertical offset between the two planes (typically this offset is called "piston" in the art) is eliminated by reducing the a coefficient to the same value. Assuming, for example, that $a_{1,2}=10$ nm and $a_{2,1}=7$ nm, the piston $(7-10=-3)$ would be subtracted from $a_{2,1}$ to produce the same a coefficient of 10 $[7-(-3)=10]$.

For purposes of notation, the prime symbol "'" is used herein to denote corrected quantities. Accordingly, once the functionality of the plane equation for section 2 overlapping section 1 has been so adjusted to produce a corrected plane equation $z'_{2,1}(x,y)$, each value of measured height data for section 2, $H_2(x,y)=\{h_2(1,1), h_2(1,2), h_2(1,3), \ldots h_2(r,s)\}$, is also adjusted to yield new corrected height values $H'_2(x,y)$ that reflect the adjustment to the tip, tilt and piston that caused the two plane equations fitted through the overlap region to mesh into a common plane. In essence, this step in the procedure generates a new set of height data $H'_2(x,y)$, $1 \leq x \leq r$ and $1 \leq y \leq s$, which consists of corrected height values that account for the difference in tip, tilt and vertical elevation produced by the x-y translation of the interferometer's objective between sections 1 and 2. The step can be carried out by extending the fitted and corrected plane equations to the entire section 2 and by calculating a correction factor, $\Delta h_{2,1}(x,y)=z_{2,1}'(x,y)-z_{2,1}(x,y)$, for each pixel in section 2. Each measured height value in section 2 is then corrected by adding the corresponding factor to the measured datum; i.e., $h_2'(x,y)=h_2(x,y)+\Delta h_{2,1}(x,y)$ for all x and y coordinates in section 2.

The next step of the process consists of a repetition of the procedure for the next overlapping regions in the sequence of tested sections (i.e., the region of overlap between sections 2 and 3 in the example). The corrected height values for section 2, $H_2'(x,y)$, are used as reference with respect to section 3 and the heights of the overlapping region in section 3 are corrected to mesh with the corrected heights obtained for the same region of section 2 during the first correction step. Accordingly, a plane equation $z_{2,3}(x,y)=a_{2,3}+b_{2,3}x+c_{2,3}y$ is fitted through the corrected height data $H_{2,3}'(x,y)$ in the region of overlap with section 3. Similarly, the measured height data in the overlapping region of the adjacent section 3 are also fitted to produce a corresponding plane equation $z_{3,2}(x,y)=a_{3,2}+b_{3,2}x+c_{3,2}y$ and the differences in tip, tilt and vertical elevation between these two plane equations are used to correct the latter to match the former. Finally, correction factors, $\Delta h_{3,2}(x,y)=z_{3,2}'(x,y)-z_{2,3}(x,y)$, are calculated for all pixels in section 3 and each measured height value in section 3 is corrected by adding the corresponding factor to the measured value; i.e., $h_3'(x,y)=h_3(x,y)+\Delta h_{3,2}(x,y)$ for all x and y coordinates in section 3.

By repeating this process sequentially for each pair of adjacent sections, all overlapping regions are brought substantially together and a map of continuous height data is progressively generated. Thus, referring again to the example of FIG. 2, $H_{4,3}(x,y)$ is corrected to mesh with $H_{3,4}'(x,y)$, $H_{5,4}(x,y)$ with H4,5'(x,y), etc., always taking corrected height data as the reference for correcting the next adjacent section, until all overlapping regions of all sections are meshed together. When a section overlaps with more than one previously corrected section (such as, for example, the section denoted as n+2 in FIG. 2, which overlaps with sections 1, 2, 3 and n+1), the reference plane is preferably obtained by treating all overlap areas as a single overlap region and fitting a plane equation through all corrected data in that region (i.e., 1, 2, 3 and n+1 in the example).

Figure 3A:
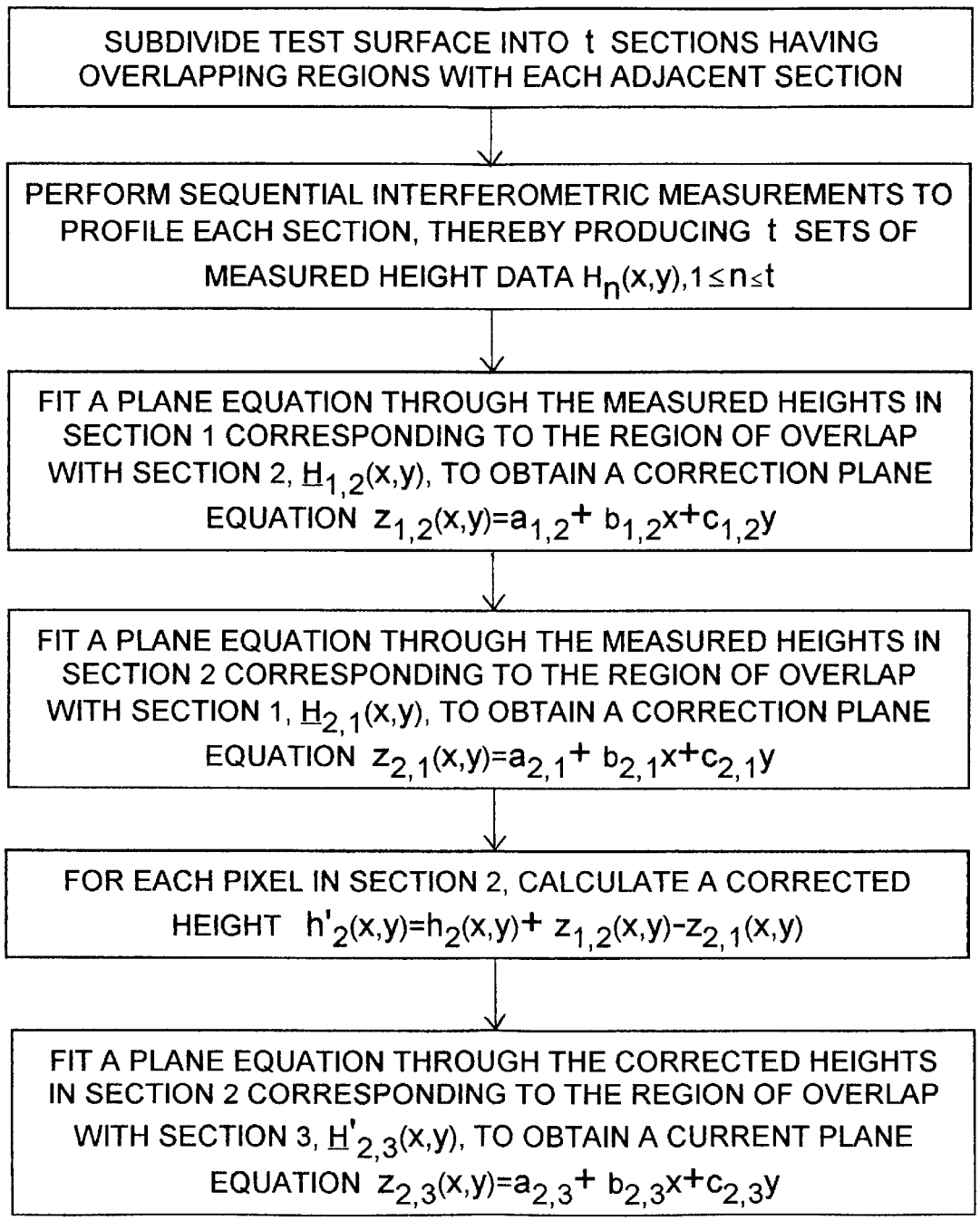
FIG. 3 is a block diagram of the process of the invention.

It is noted that in practice the procedure is much simplified by the fact that each corrected plane equation $H_{n+1,n}'(x,y)$, $1 \leq n \leq t-1$, in fact corresponds to the reference plane equation $H_{n,n+1}(x,y)$ from which it was derived. Therefore, there is no need for calculating and applying correction factors at each overlap region. Once the corrected heights of section n in an overlapping region between sections n and n+1 $[H_{n,n+1}(x,y)]$ are fitted to yield a current reference plane equation $z_{n,n+1}(x,y)$, and the overlapping measured data in section n+1 are fitted to produce a corresponding plane equation $z_{n+1,n}(x,y)$, the corrected plane equation for section n+1 is obtained simply by setting it equal to the current reference plane equation; i.e., $z_{n+1,n}'(x,y)=z_{n,n+1}(x,y)$. Thus, each measured height in section n+1 is corrected by a factor equal to the difference between the two equations at the corresponding pixel, as follows:

$$h_{n+1}'(x,y)=h_{n+1}(x,y)+[z_{n,n+1}(x,y)-z_{n+1,n}(x,y)],$$

for all x and y coordinates in section n+1. FIG. 3 is a block diagram illustrating the general steps of the procedure of the invention.

Figure 4:
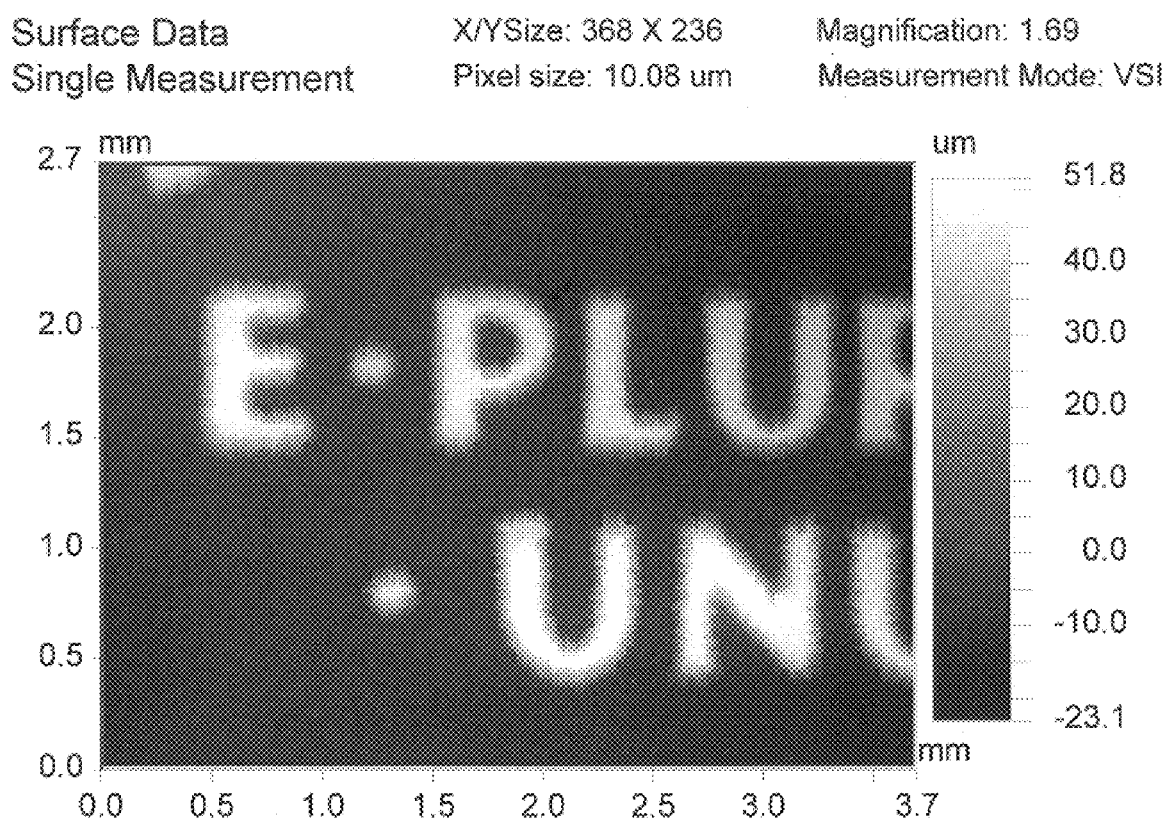
FIG. 4 is a first VSI measurement taken with a field of view corresponding to a magnification of 1.5×, with a pixel spacing of 5.60 μm, of the first half of the pattern (E PLUR UNU) on a coin.
Figure 5:
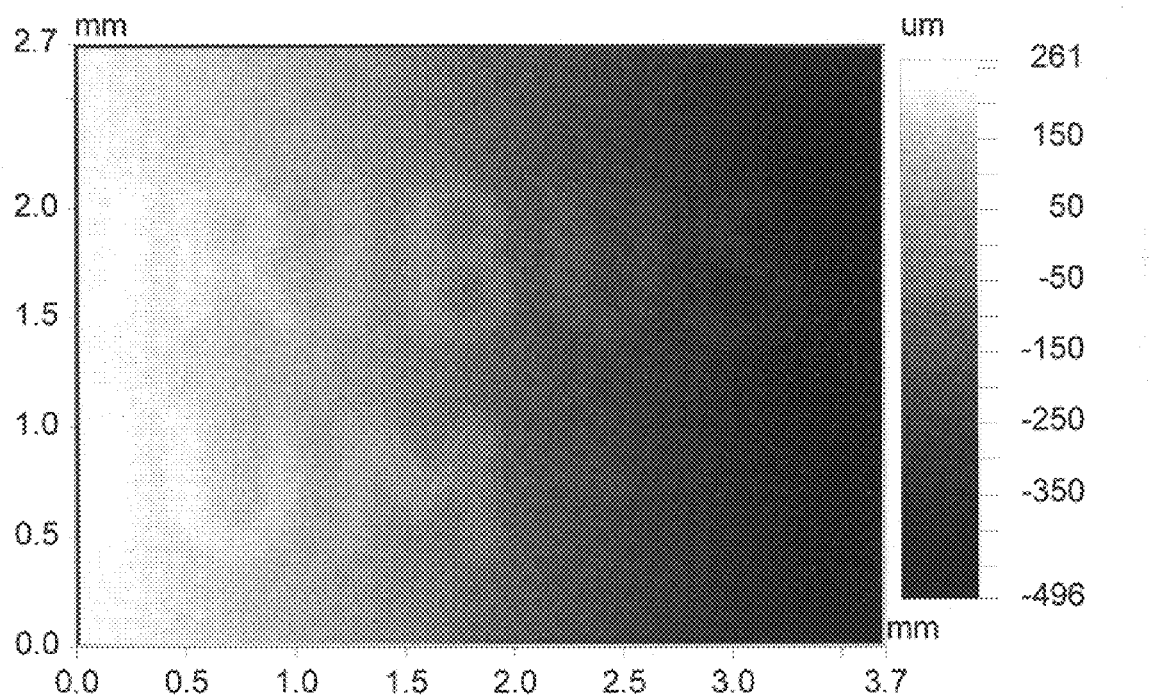
FIG. 5 is a second measurement taken with a field of view corresponding to a magnification of 1.5×, with a pixel spacing of 5.60 μm, of the second half of the pattern (URIBUS NUM), where a predetermined tilt is introduced so that the two measurements do not fall into the same plane.
Figure 6:
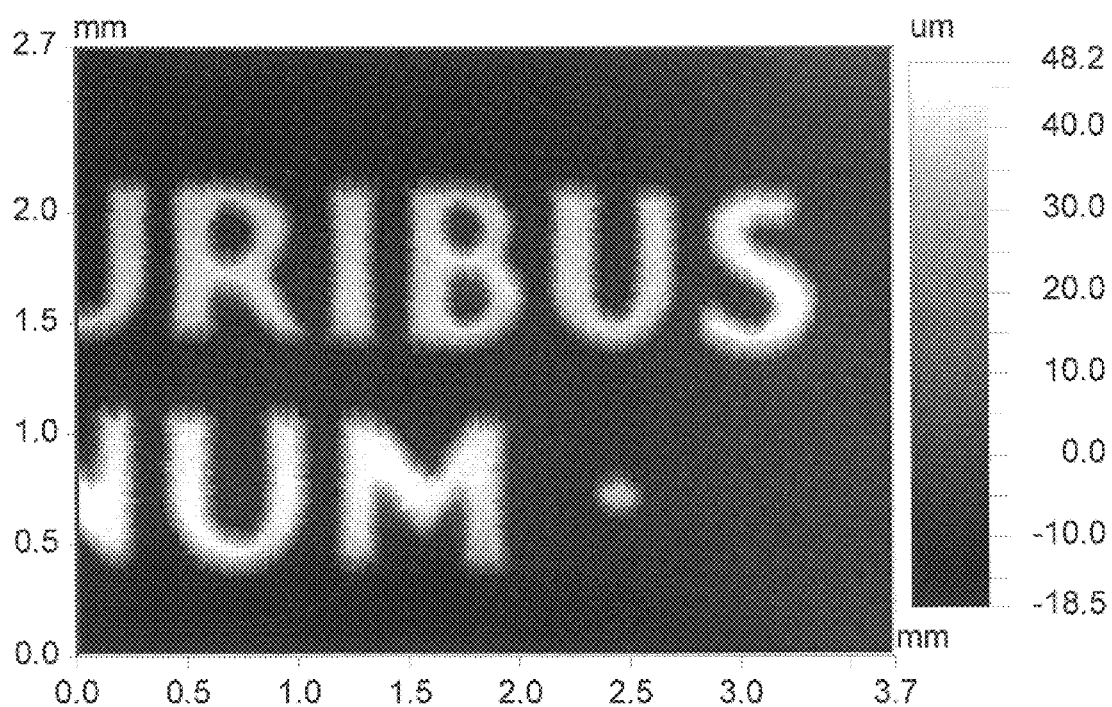
FIG. 6 is another measurement of the region of FIG. 5, but with the tilt removed, thereby approximating the tilt plane of the first measurement (FIG. 4) and the profile expected for this region after the corrections provided by the invention.
Figure 7:
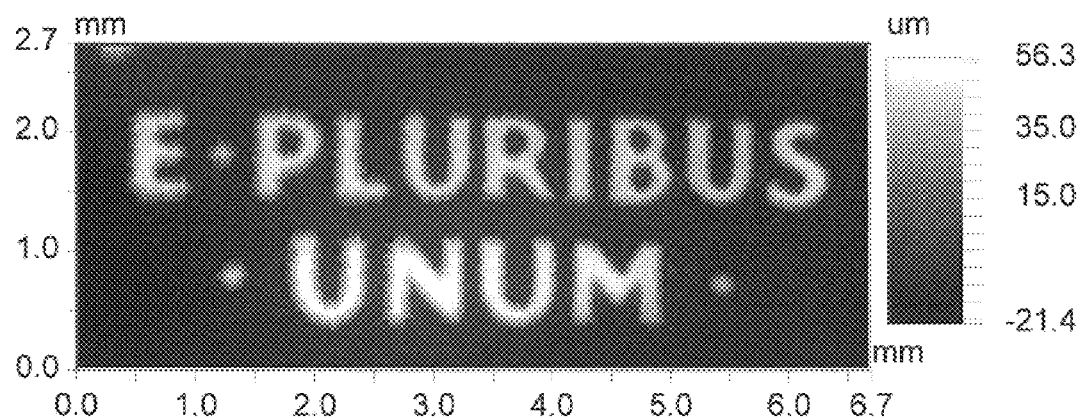
FIG. 7 is a composite profile obtained combining the data from the first and second measurements (FIGS. 4 and 5) according to the invention.

The method of the invention produces smooth images of the entire surface area 10 with the same resolution afforded by the objective of the interferometer within the smaller field of view 12. FIGS. 4–7 illustrate the results obtained by combining two height data sets of a coin according to the method of the invention, using the words "E PLURIBUS UNUM" as a recognizable feature extending over the field of view of the interferometer. FIG. 4 is a VSI measurement of the first half of the pattern (E PLUR UNU) taken with a field of view corresponding to a magnification of 1.5×, and a pixel spacing of 5.60 $\mu$m. FIG. 5 is a second measurement at 1.5× magnification, with a pixel spacing of 5.60 $\mu$m, of the second half of the pattern (URIBUS NUM), where a predetermined tilt is introduced so that the two measurements do not fall into the same plane. This figure shows the error produced by such a tilt. FIG. 6 is the same measurement of the region of FIG. 5, but with the tilt removed, thereby approximating the tilt plane of the first measurement and the profile expected for this region after the corrections provided by the invention. FIG. 6 is provided for visual reference only, to illustrate what the procedure should do to minimize tilt differences in the two measurements. FIG. 7 is a composite profile obtained combining the data from the first and second measurements according to the invention. Notice that the procedure effectively increased the field of view in the x direction by approximately 80% (from 3.7 $\mu$m to 6.7 $\mu$m), while maintaining a pixel spacing of 5.60 $\mu$m, thus preserving the original lateral resolution.

Figure 8:
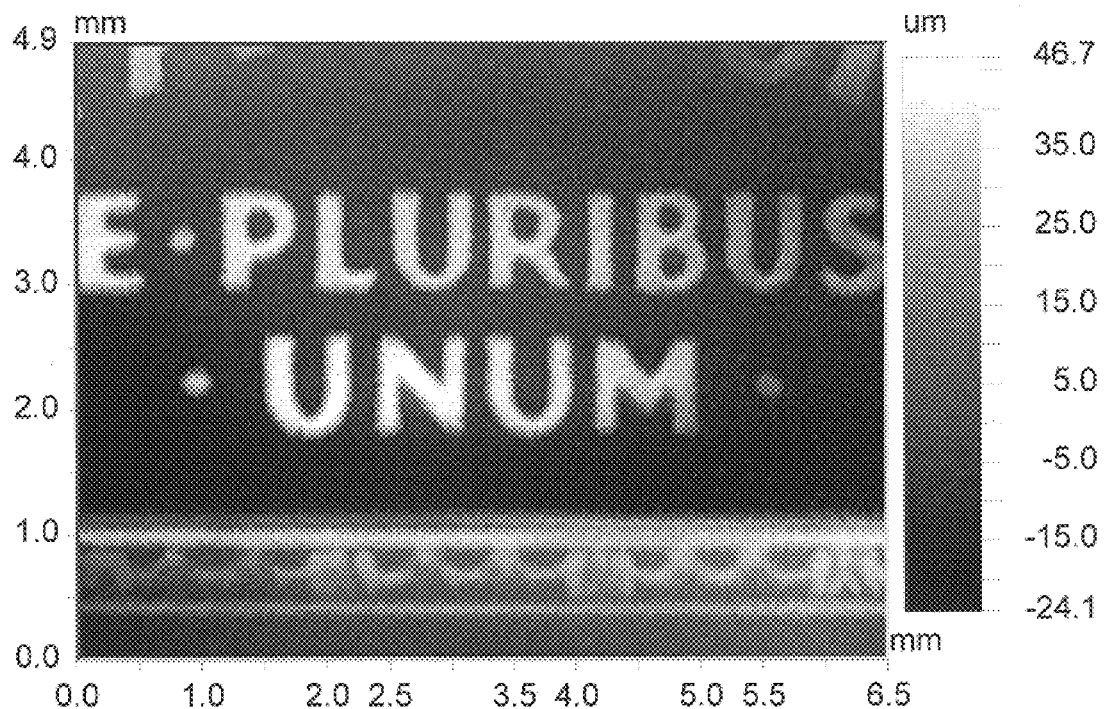
FIG. 8 is a profile corresponding to the coin of FIG. 7, but taken with a larger field of view, sufficient to span the entire image without a necessity for x-y translation.
Figure 9:
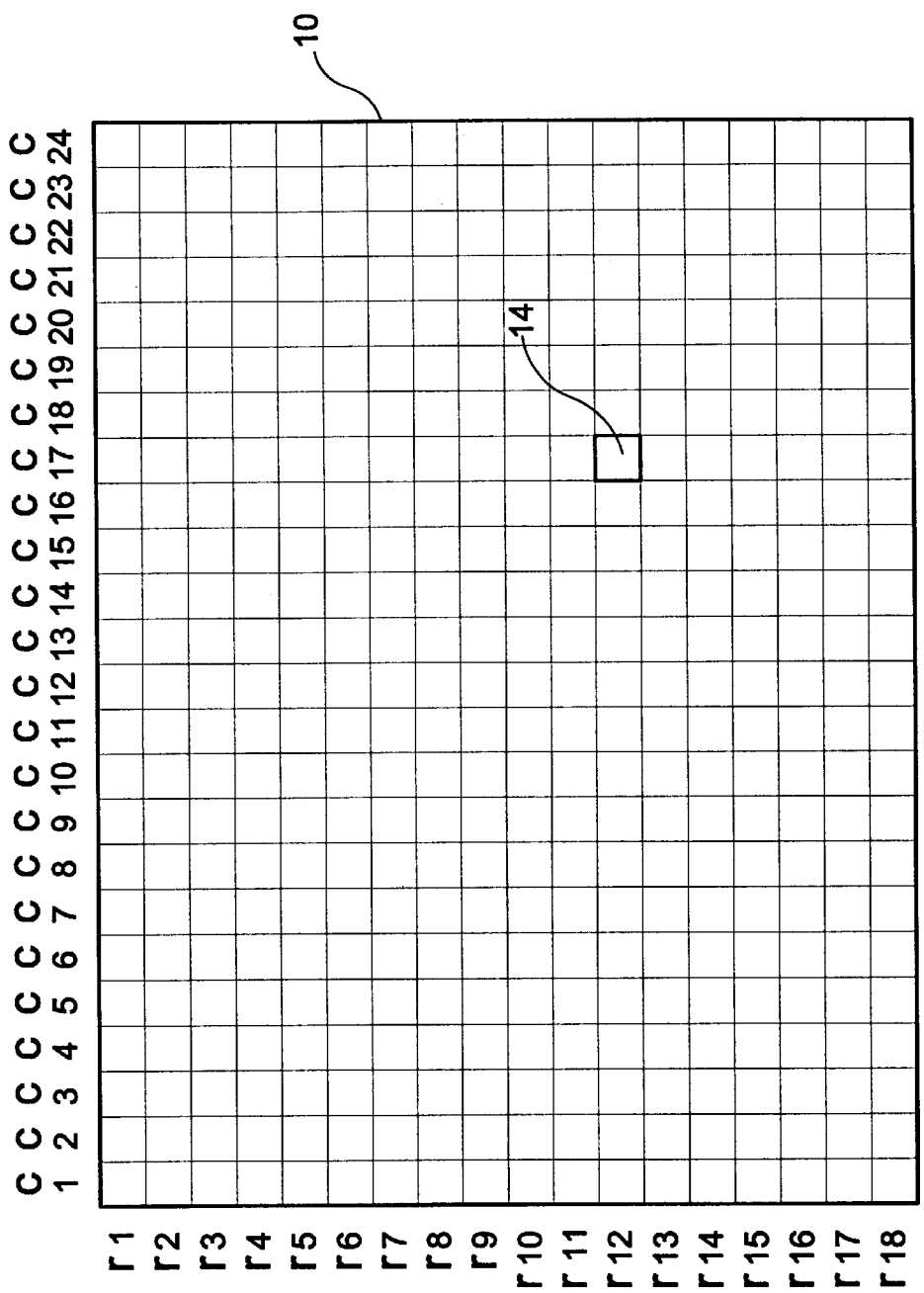
FIG. 9 is a test-sample surface of dimensions corresponding to the size of 18×24 pixels in the profiling instrument to show the stitching order procedure of the invention.

FIG. 8 is a profile corresponding to the coin of FIG. 7, but taken with a larger field of view sufficient to span the entire image without x-y translation. This figure illustrates the loss of resolution attendant to this approach, as compared to the meshing approach of the invention.

During the process of utilizing this technique to stitch together multiple sets of height data, we also developed a preferred approach in the selection of which adjacent sets to combine at each step. Once an initial set (referred to above as the reference set) is chosen according to some criterion, it is desirable to have a systematic procedure for selecting each successive set of data among all sets adjacent to the composite set. This is achieved at every step by counting the number of valid pixels in the overlapping region of each adjacent section and selecting the region with the largest number of valid pixels as the one to be stitched at that step. As used herein, a "valid pixel" in a region of overlap between two adjacent sections is defined as an x-y coordinate for which the data in the corresponding pixels of both sections are valid. If one or both of the data values corresponding to a given pixel common to both sections is found to be invalid, that pixel is not counted for consideration as a valid pixel. Valid data points are defined as those having a value within an acceptable threshold for the type of measurement being performed. As well understood by one skilled in the field of profilometry, data points are routinely checked for validity before use to produce a surface profile and invalid points may be discarded and replaced with fitted values produced by restoration routines.

Referring back to FIG. 2 to illustrate the selection procedure of the invention, section 1 could be selected arbitrarily as the initial reference section, thereby defining sections 2, n+1 and n+2 as the adjacent sections that are candidates for the first stitching step. The method of the invention requires that the height values for all pixels in both sections of the overlapping regions between sections 1 and 2, 1 and n+1, and 1 and n+2 be checked for validity according to some criterion well established in the art. Typically, a value is considered valid if found to be within a predetermined range consistent with expectation. If any value is found to be invalid, the corresponding pixel is discounted. At the same time, all pixels corresponding to pairs of valid values are counted in each overlapping region. Once the overlapping region with the most valid pixels is identified, the corresponding section adjacent to the reference section is selected for carrying out the stitching procedure between the two sections. Assuming, for example, that the overlapping region 18 between sections 1 and n+1 contains the largest number of valid pixels, the data sets from the two sections would be combined according to a stitching procedure, such as outlined in FIG. 3, to produce a composite set of corrected data corresponding to the surface area covered by sections 1 and n+1. The resulting composite section, comprising sections 1 and n+1, would now be surrounded by adjacent sections 2, n+2, 2n+1 and 2n+2. The procedure would be repeated by checking the height values for all pixels in each overlapping region of the data sets corresponding to these sections. If for example, it turned out that the region of overlap between the composite section (formed by sections 1 and n+1 ) and section n+2 had the largest number of valid pixels, the measured height data for section n+2 would be stitched to the composite set to produce a new composite set corresponding to sections 1, n+1 and n+2. The procedure would then be so repeated until all data sets were corrected and combined into a uniform, consistent composite set for the entire sample surface.

Figure 10:
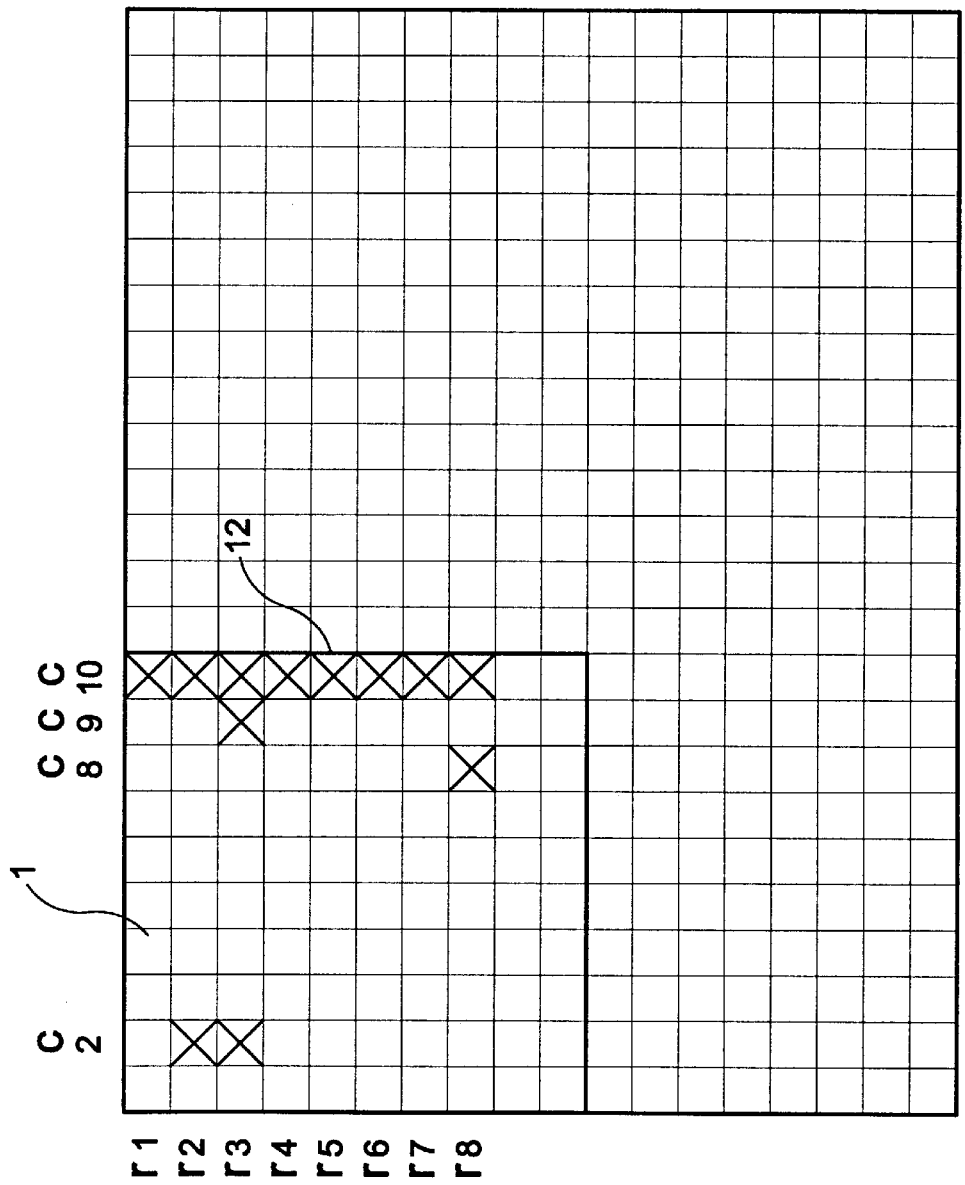
FIG. 10 illustrates an arbitrarily-chosen first section of measured data within the sample surface of the example.
Figure 11:
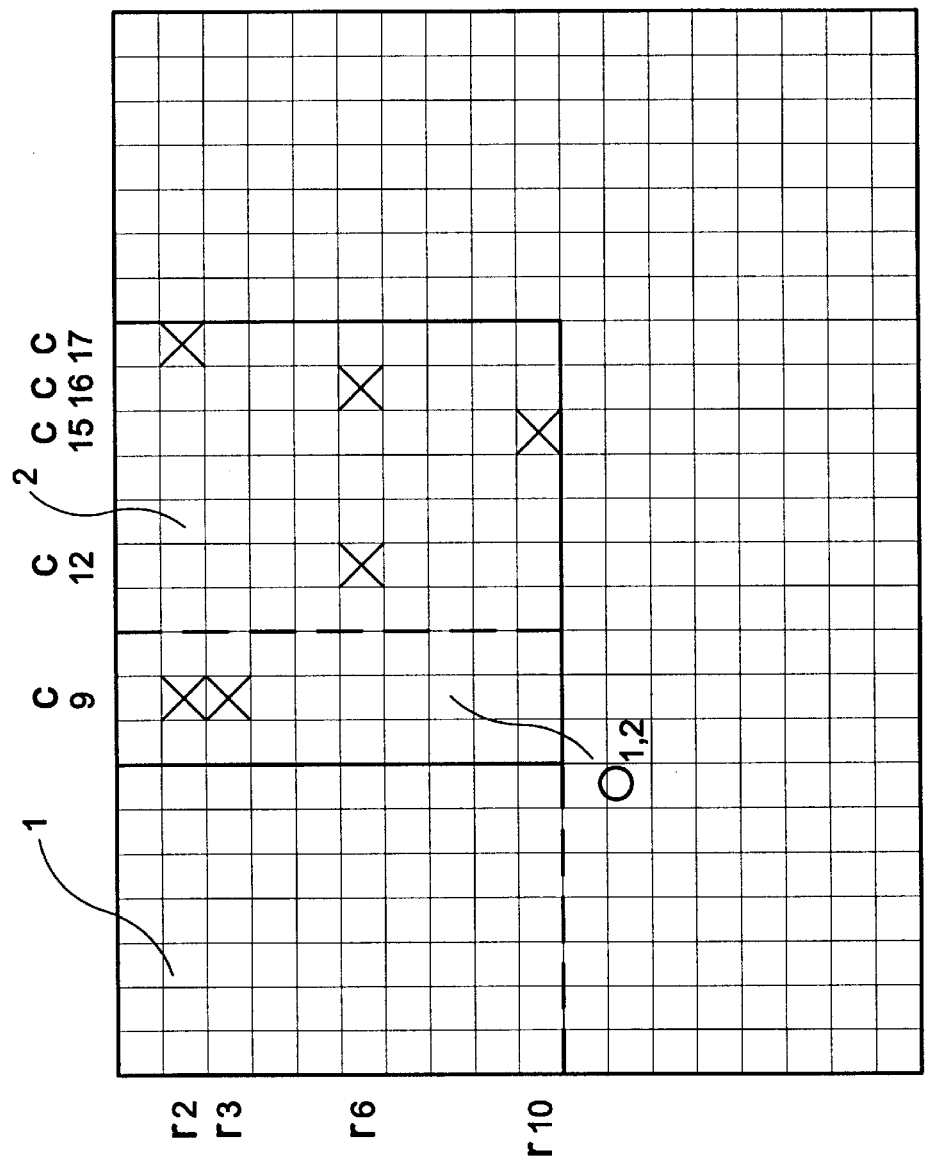
FIG. 11 illustrates an arbitrary overlap between the first and second sections of measured data within the sample surface of the example.

The procedure of the invention is further illustrated by the example shown in FIGS. 9–15, where a sample surface 10 is shown covering an area corresponding to 18×24 pixels of the instrument's sensor device (18 rows and 24 columns, enumerated on the side of the surface in matrix format, for clarity). Each square in the figures denotes the area corresponding to a pixel 14, one being highlighted in FIG. 9. It is assumed, for example, that the field of view 12 of the instrument being used is smaller than the surface 10 and that it covers an area corresponding to a square of 10×10 pixels, as illustrated in FIG. 10. It is clear in the art that in practice a much larger number of pixels is involved in the field of view of typical instrumentation, but small numbers are used here for simplicity of illustration. Toward the same end, all pixels with valid data points are shown blank and those corresponding to an invalid value are marked by an x within the pixel's square. Row and column numbers (r1 to r18 and c1 to c24, respectively) are used to identify positions of pixels within the field of view and within the sample surface. Only the row and column numbers corresponding to pixels that are significant for the discussion are shown in the figures.

Referring to FIG. 10, it is assumed that the first measurement is made covering the first 10 rows and 10 columns of the sample surface, arbitrarily chosen to be the initial section 1 in the measurement sequence. As illustrated, using the same notation adopted above, the measurement produced 12 invalid data points, $h_1(1,10)$, $h_1(2,2)$, $h_1(2,10)$, $h_1(3,2)$, $h_1(3,9)$, $h_1(3,10)$, $h_1(4,10)$, $h_1(5,10)$, $h_1(6,10)$, $h_1(7,10)$, $h_1(8,8)$ and $h_1(8,10)$. Section 2, shown in FIG. 11 in solid line, corresponds to the second set of measurements and illustrates an arbitrarily-chosen overlap of 3 columns (c8–c10). The measurement in section 2 produced six invalid data points, two of which, $h_2(2,9)$ and $h_2(3,9)$, are in the region of overlap $O_{\underline{1,2}}$ (the underlined notation is used to denote data in regions of overlap, as adopted above). Thus, using the approach of the invention, the region of overlap $O_{1,2}$ contains 11 pixels with invalid data points, based on one pixel with an invalid value from both sections 1 and 2 $\{h_1(3,9)$ and $h_2(3,9)\}$ and ten pixels with one invalid value from one section or the other ($_1(1,10)$, $h_2(2,9)$, $h_1(2,10)$, $h_1(3,10)$, $h_1(4,10)$, $h_1(5,10)$, $h_1(6,10)$, $h_1(7,10)$, $h_1(8,8)$ and $h_1(8,10)\}$. Therefore, the overlap region $O_{1,2}$ contains 11 invalid pixels and, correspondingly, it is assigned a count of 19 valid pixels (30−11=19, based on a total number of 30 pixels in the region).

Figure 12:
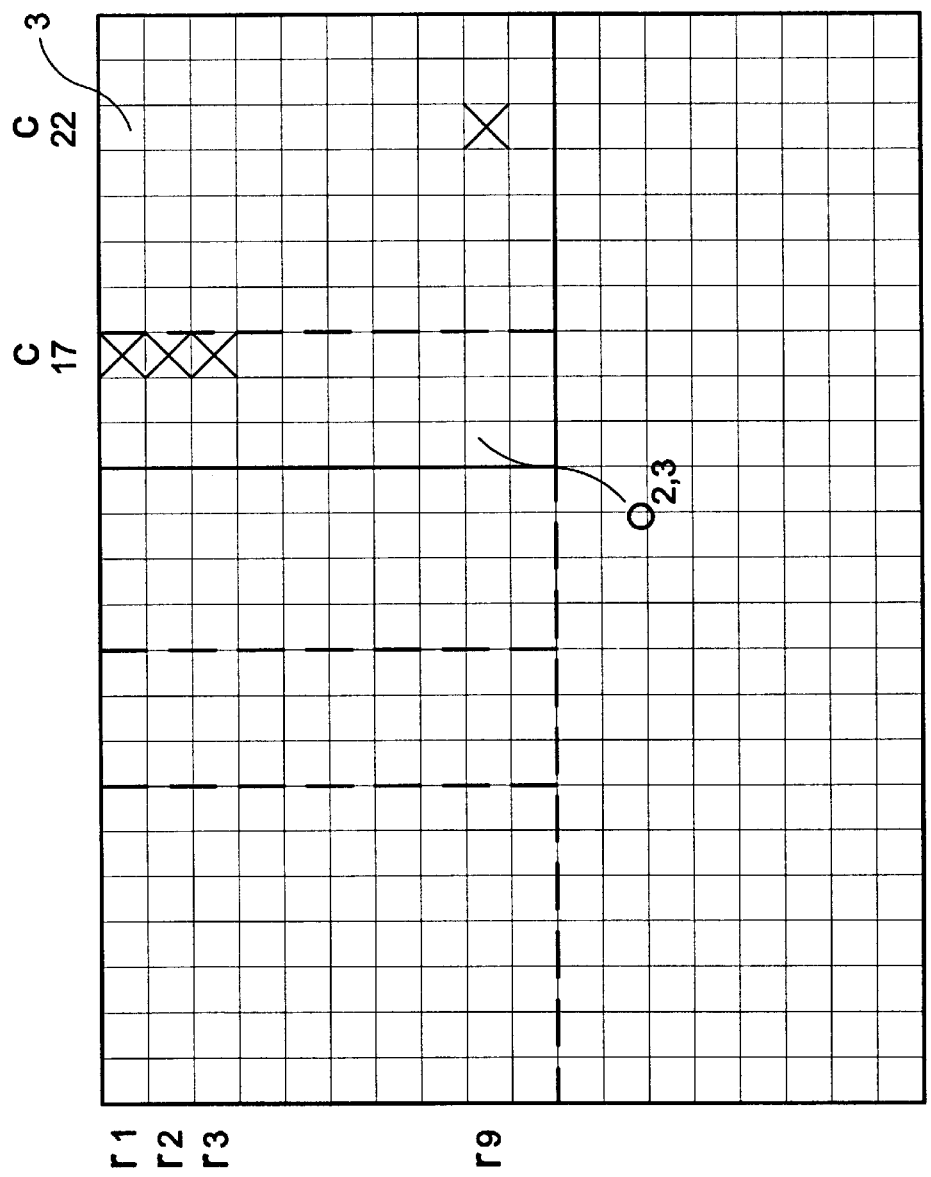
FIGS. 12–15 illustrate additional sections selected in sequential fashion within the sample surface of the example to provide measured data for the entire area, wherein each section overlaps at least one other section.
Figure 13:
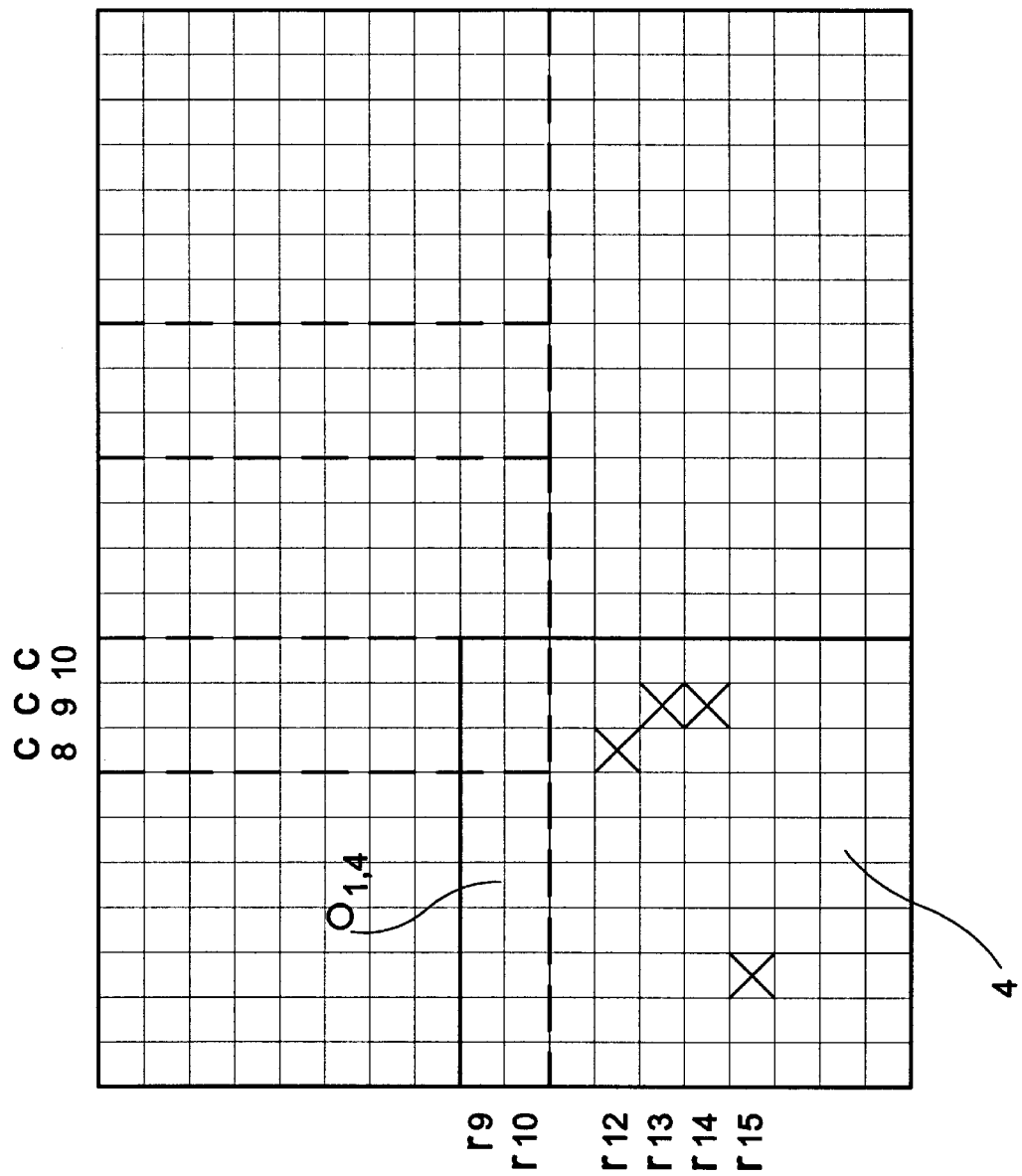
Figure 14:
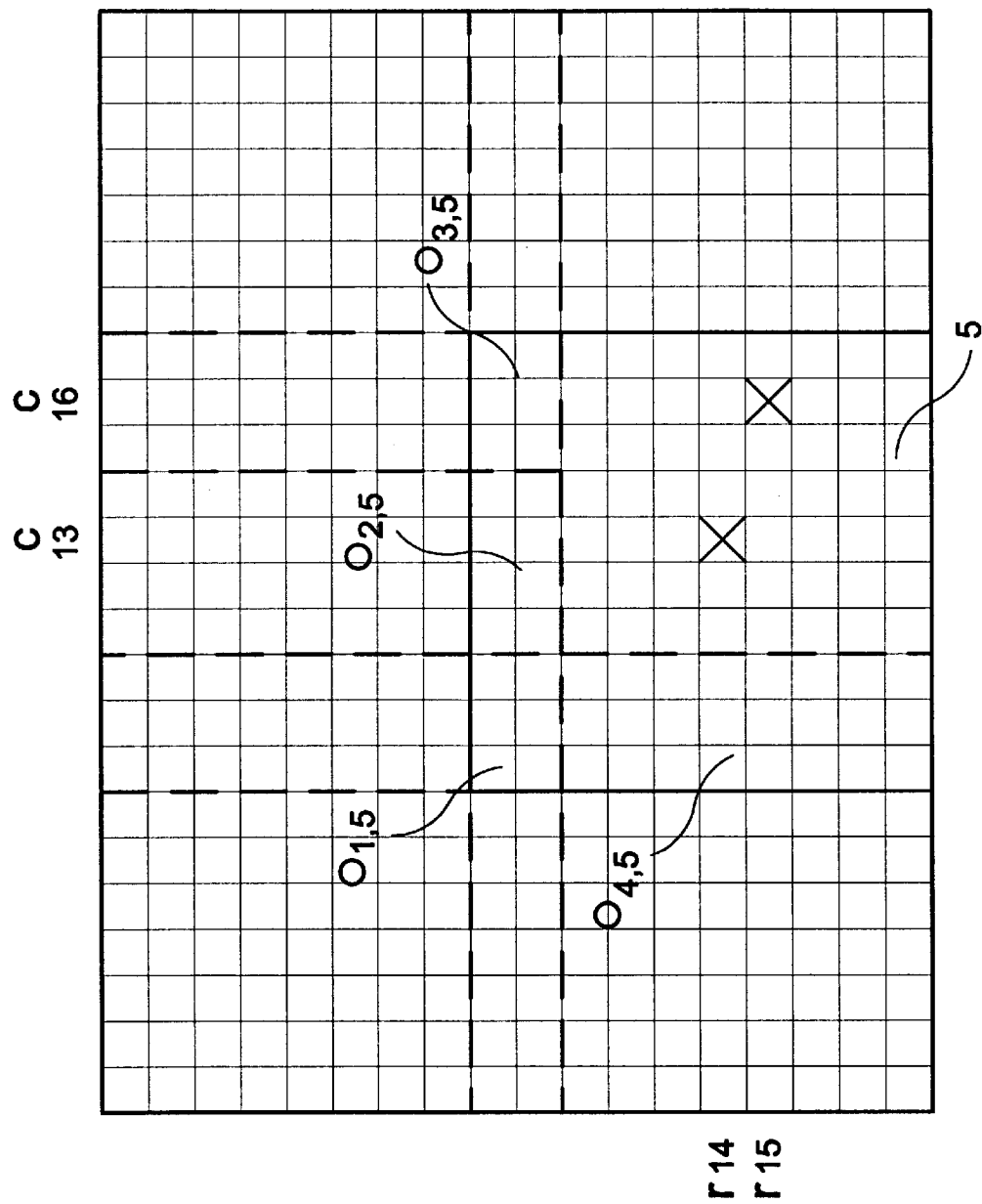
Figure 15:
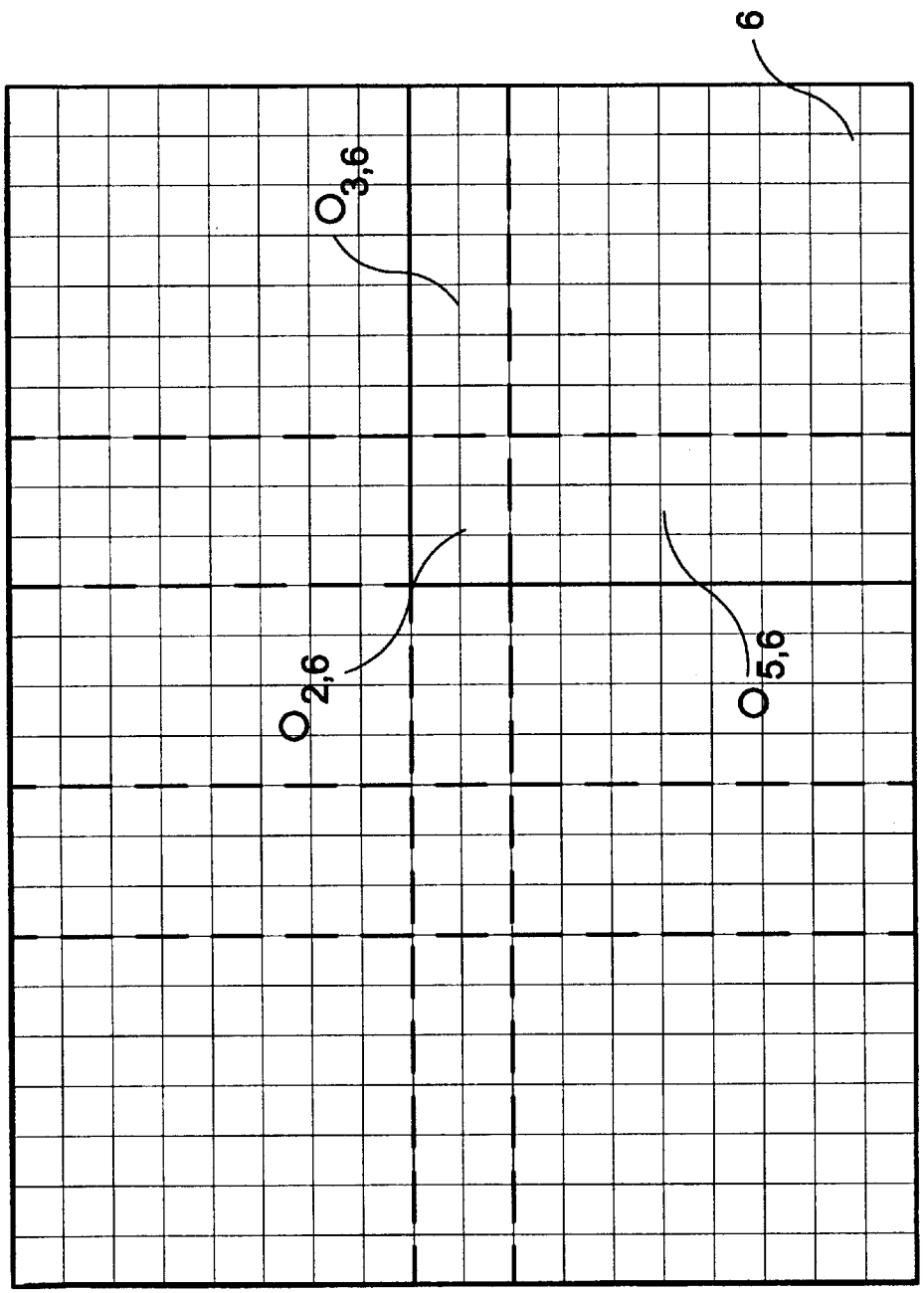

The measurement is repeated after shifting the field of view to a new section 3, shown in solid line in FIG. 12 (note that all previously measured sections are shown in dash line for contrast in all figures). The measurement produced four invalid values, three of which $\{h_3(1,17)$, $h_3(2,17)$ and $h_3(3,17)\}$ in the region of overlap with section 2, $O_{2,3}$. It is noted that the regions of overlap selected for successive measurements may vary in size, but it is preferred to select them substantially the same in each coordinate direction, so as to provide a more meaningful basis of comparison of valid-pixel presence. Accordingly, the region $O_{2,3}$ is chosen here to also cover 3 columns, as did region $O_{1,2}$. Based on the invalid data points shown in FIGS. 11 and 12, it is clear that five invalid pixels lie in the region $O_{2,3}$, one pixel with invalid data from both sections 2 and 3 $\{h_2(2,17)$ and $h_3(2,17)\}$ and four pixels with one invalid value from one section or the other $\{h_2(6,16)$, $h_2(10,15)$, $h_3(1,17)$ and $h_3(3,17)\}$. Thus, the overlap region $O_{2,3}$ is assigned a count of 25 valid pixels (30−5=25).

Continuing the process of taking successive measurements, section 4 (FIG. 13) is selected with an overlap $O_{1,4}$ of two rows of ten pixels each (r9 and r10) with section 1. The measurement shows no invalid pixels in this region, which is therefore assigned a count of 20 valid pixels (no invalid data were found in the overlapping region of section 1 either). The measurement for section 5 (FIG. 14) shows no invalid data in the 3-column region of overlap with section 4, $O_{4,5}$; and none either in the region of overlap with section 1, $O_{1,5}$; the region of overlap with section 2, $O_{2,5}$; or the region of overlap with section 3, $O_{3,5}$. Note that $O_{1,5}$ covers the six pixels corresponding to the intersection of rows r9–10 and columns c8–c10; $O_{2,5}$ covers the 20 pixels corresponding to the intersection of rows r9–10 and columns c8–c17; and $O_{3,5}$ covers the six pixels corresponding to the intersection of rows r9–10 and columns c15–c17. Accordingly, $O_{4,5}$ has three invalid pixels {resulting from $h_4(12,8)$, $h_4(13,9)$ and $h_4(14,9)\}$, and will be assigned a valid-pixel count of 27 (30−3=27). The region $O_{1,5}$ is assigned a count of six valid pixels because no invalid data resulted in the region from either section 1 or 5. The region $O_{2,5}$ is assigned a count of 19 valid pixels because of one invalid value in section 2, $h_2(10,15)$; and the overlap region $O_{3,5}$ is assigned a count of six valid pixels because no invalid data resulted in the region from either section 3 or section 5. Finally, a measurement over section 6 (FIG. 15) shows no invalid data values. Accordingly, $O_{5,6}$ has one invalid pixel (resulting from $h_5(15,16)$) and will be assigned a count of 29 (30−1=29). The region $O_{2,6}$ is assigned a count of five valid pixels because of one invalid value in section 2, $h_2(10,15)$; and the overlap region $O_{3,6}$ is assigned a count of 19 valid pixels because of one invalid value in section 3, $h_3(9,22)$.

All information needed for starting the stitching process of the invention is now available. A reference section is selected as a starting point, section 1 being chosen here for convenience. A preferred method of selection is described below. Sections 2, 4 and 5 are adjacent to section 1 in the layout of the example. Comparing the number of valid pixels in the overlapping regions $O_{1,2}$, $O_{1,4}$ and $O_{1,5}$, the greatest number occurs in the region between section 1 and section 4 (20 valid pixels in $O_{1,4}$ versus 19 in $O_{1,2}$ and six in $O_{1,6}$). Accordingly, the measured data set of section 4 is stitched to the reference set of section 1 according to the procedure outlined in FIG. 3.

Figure 16:
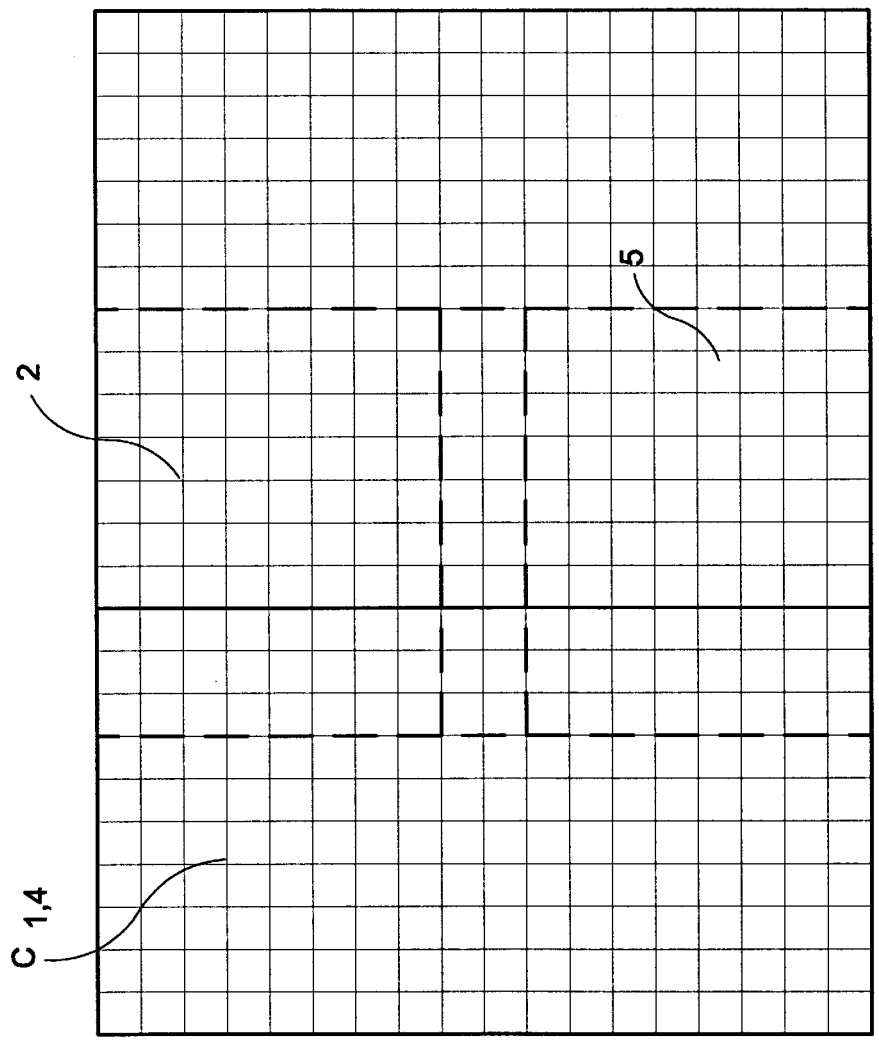
FIGS. 16–19 illustrate the process of sequentially stitching sets of measured data to provide a composite set of corrected data corresponding to the entire surface tested.
Figure 17:
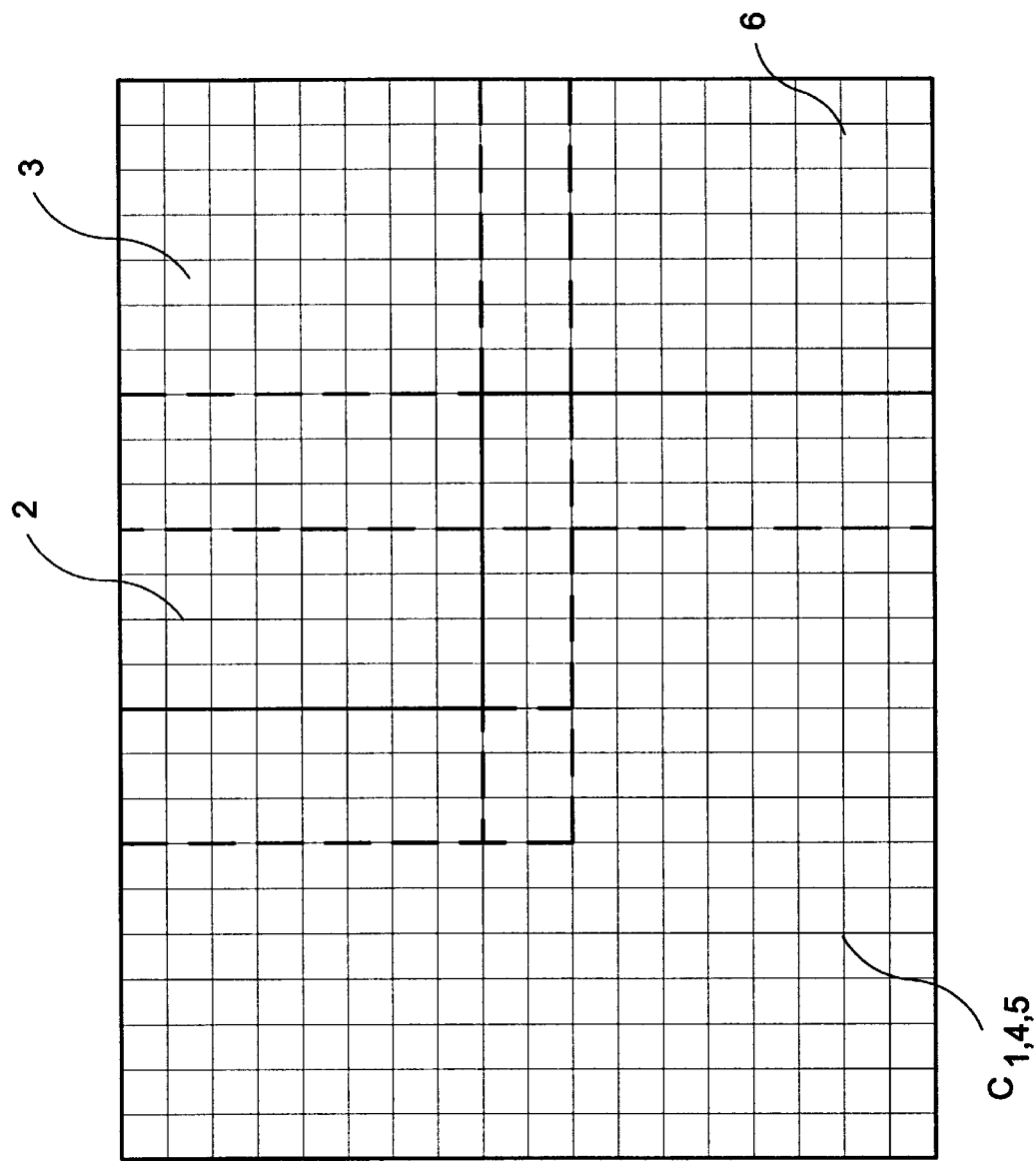

The area corresponding to the resulting composite section $C_{1,4}$ is illustrated in solid line in FIG. 16, where the adjacent sections 2 and 5 are seen in dash line. A comparison of the regions of overlap between the composite section $C_{1,4}$ and the sections 2 and 5 shows that the latter has the greatest number of valid pixels (27 versus 19). Therefore, section 5 is stitched to the composite section $C_{1,4}$ to produce a new composite data set corresponding to composite section $C_{1,4,5}$, illustrated in FIG. 17. The yet unstitched sections 2, 3 and 6 are shown in dash line in the figure. Repeating the process of selection with respect to the current composite section $C_{1,4,5}$, it is found that the section with a region of overlap with the largest number of valid pixels is section 2 because of the contribution of 19 pixels from $O_{1,2}$ and 16 additional pixels from the portion of $O_{2,5}$ not also overlapping $O_{1,2}$. The overlapping portion between $O_{1,2}$ and $O_{2,5}$ is obviously counted only once in determining the valid pixels in the region of overlap between section 2 and the composite section $C_{1,4,5}$. Thus, section 2 overlaps with 35 valid pixels; section 3 with six, corresponding to the region $O_{3,5}$; and section 6 with 29, corresponding to the region $O_{5,6}$.

Figure 18:
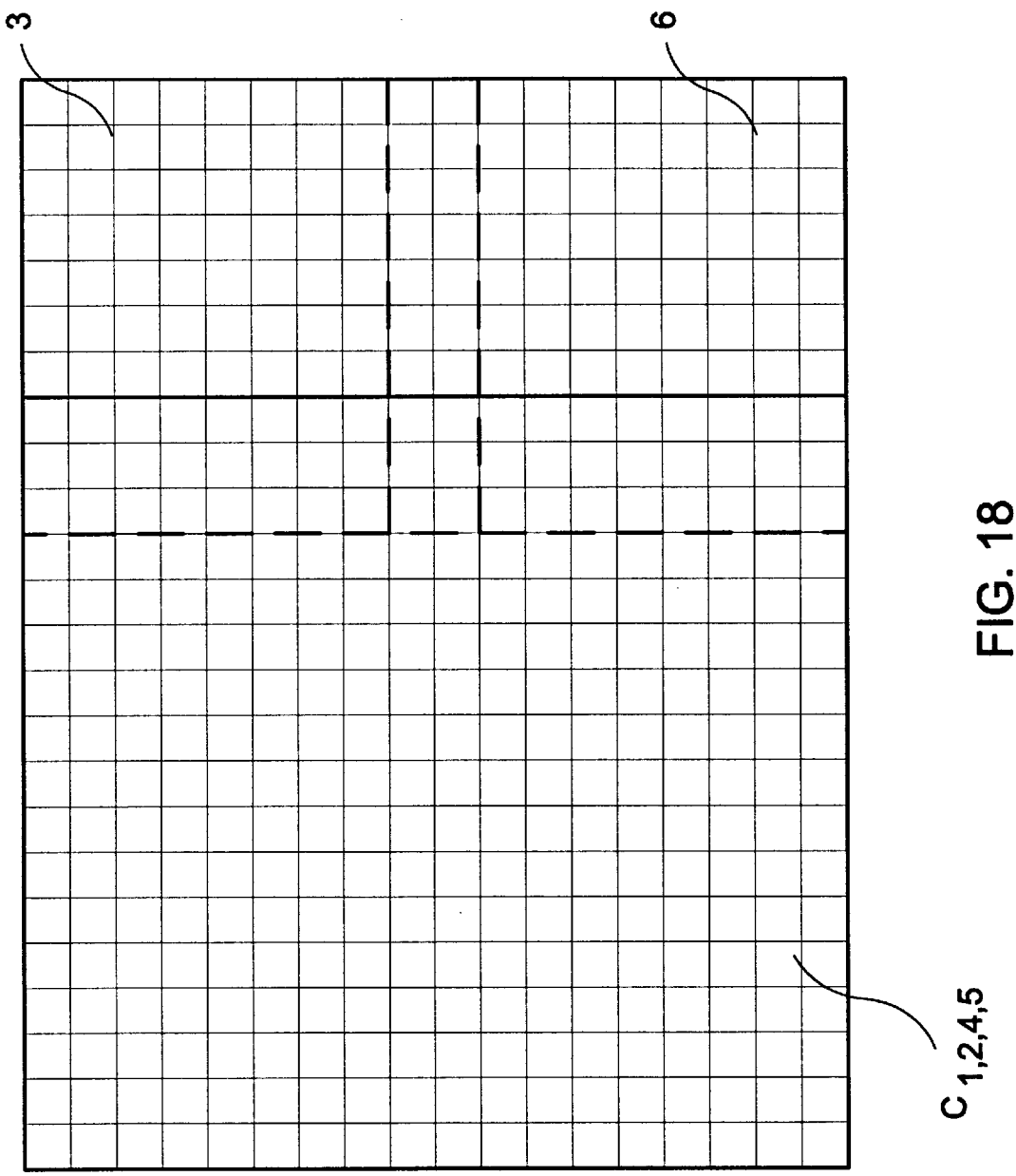

Accordingly, section 2 is selected for stitching and a new composite set of data is generated corresponding to a new composite section $C_{1,2,4,5}$, shown in FIG. 18.

Figure 19:
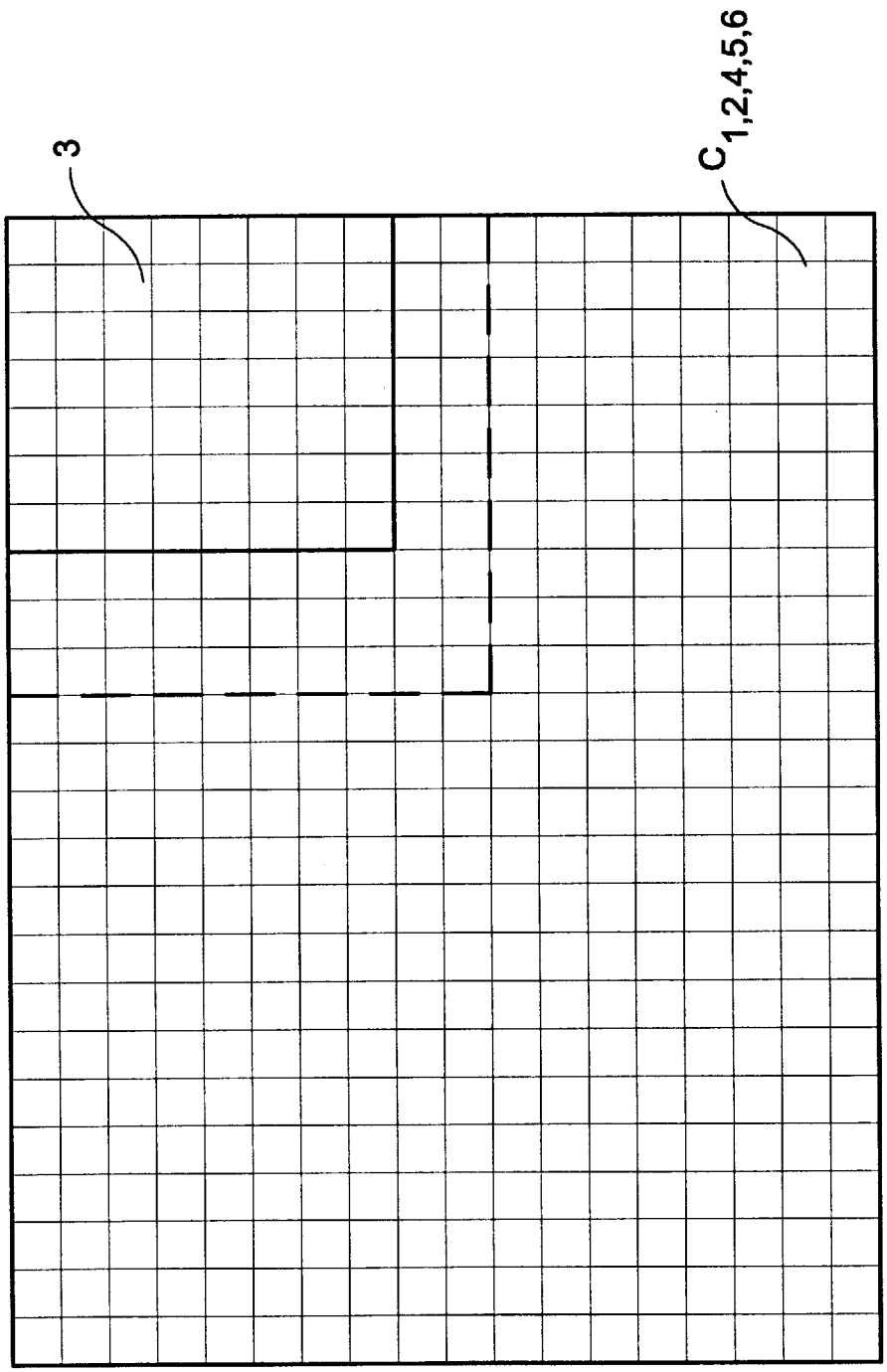
Figure 20A:
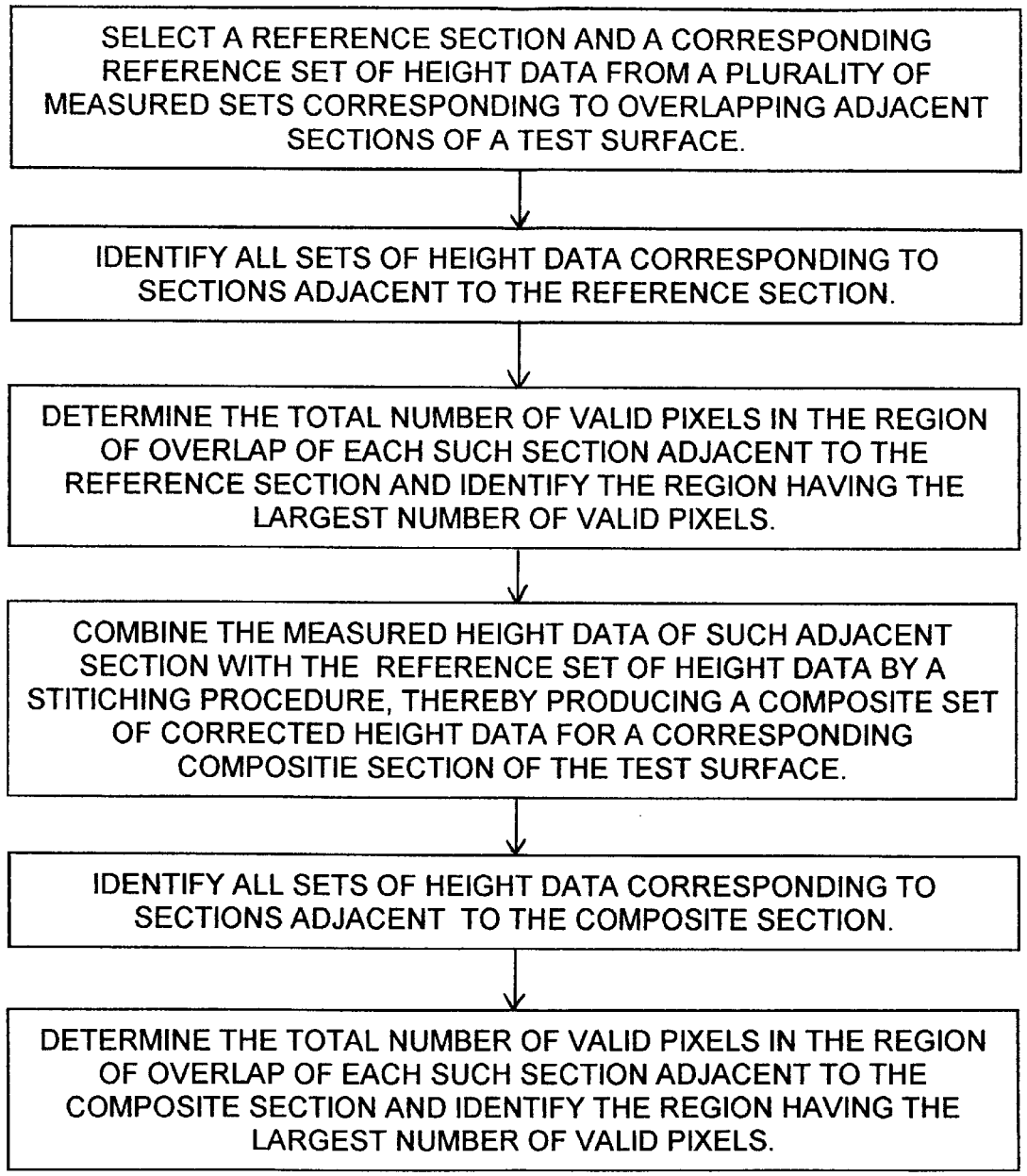
FIG. 20 is a block diagram of the selection process of the invention for sequentially combining sets of measured data.

Comparing the regions of overlap of $C_{1,2,4,5}$ with the remaining sections 3 and 6, the largest number of valid pixels is found in section 6 because of the contribution of 29 pixels from $O_{5,6}$, compared to the 25 pixels from section 3 in the region $O_{2,3}$. Accordingly, section 6 is selected for stitching and a new composite set of data is generated corresponding to a new composite section $C_{1,2,4,5,6}$, shown in FIG. 19. Finally, section 3 is stitched to the last composite set of data to complete the stitching operation. The procedure of this aspect of the invention is outlined in FIG. 20.

We found that this procedure provides a useful systematic approach to the problem of selecting which data set to stitch to the current composite set while carrying out the stitching operation of the invention. The procedure appears to work well regardless of the starting point. That is, the original selection of the reference section produces useful results even when arbitrary. On the other hand, in order to maximize the use of the available information, we opted to select the initial reference section by choosing the section based on the overall largest number of valid pixels. That is, the total number of valid pixels in each section is counted and the section having the largest number is selected as the reference section. Obviously, any one of two or more sections with the same largest number of valid pixels is chosen in case of a tie. We found that this approach often improves the overall result; therefore, it is preferred. We also found that an overlap of at least 20 percent of the field-of-view area between measurements, while not critical, is preferred for good and consistent results. Obviously, sufficient overlap data is required in order to produce a good combination of multiple sets of data according to the invention.

Figure 21A:
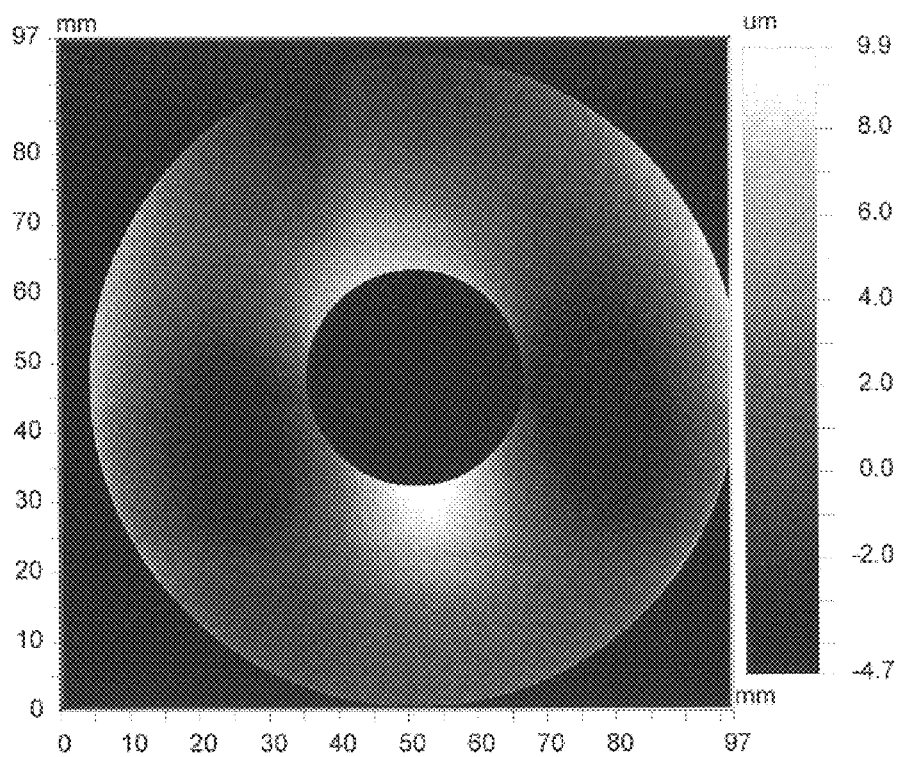
FIG. 21A is a height map of a sample surface, an optical disk, derived from data combined according to the stitching method of FIG. 3 in row by row sequence.
Figure 21B:
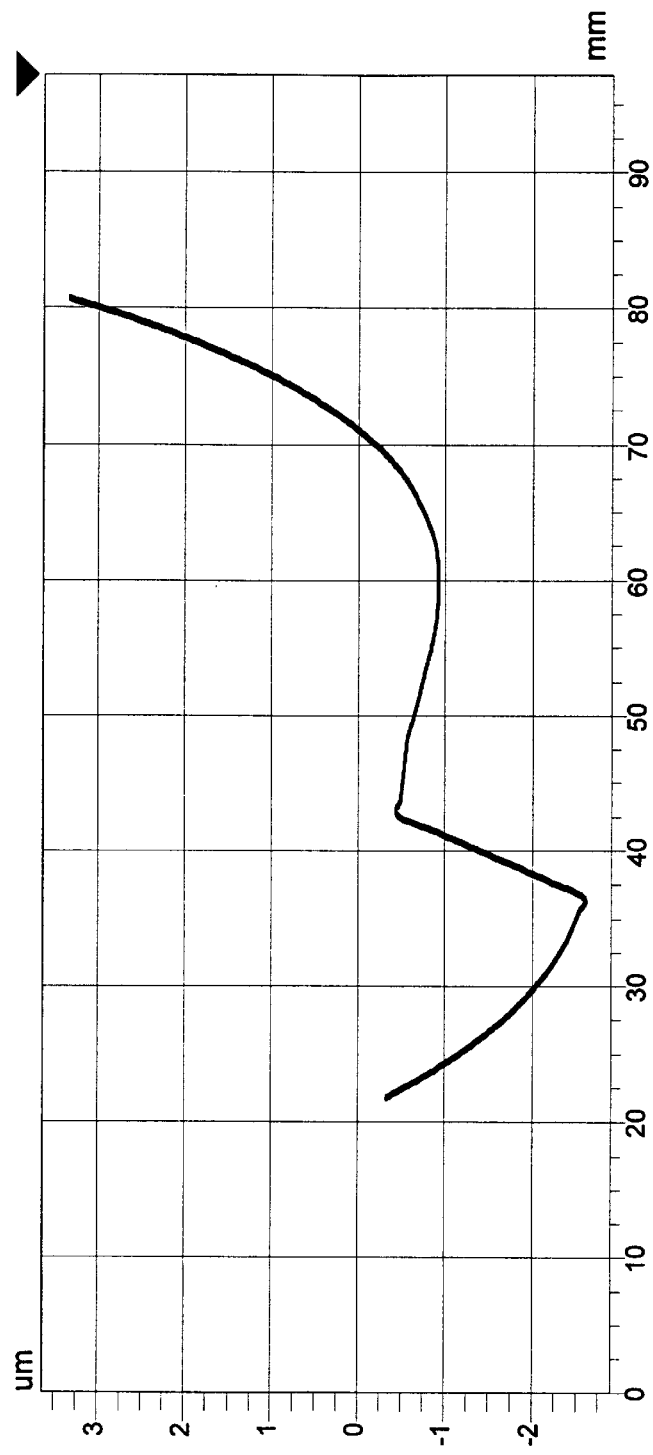
FIG. 21B illustrates the x profile of the height measurements of FIG. 21A through the top portion of the disk, showing step variations that are not as apparent in the map.
Figure 21C:
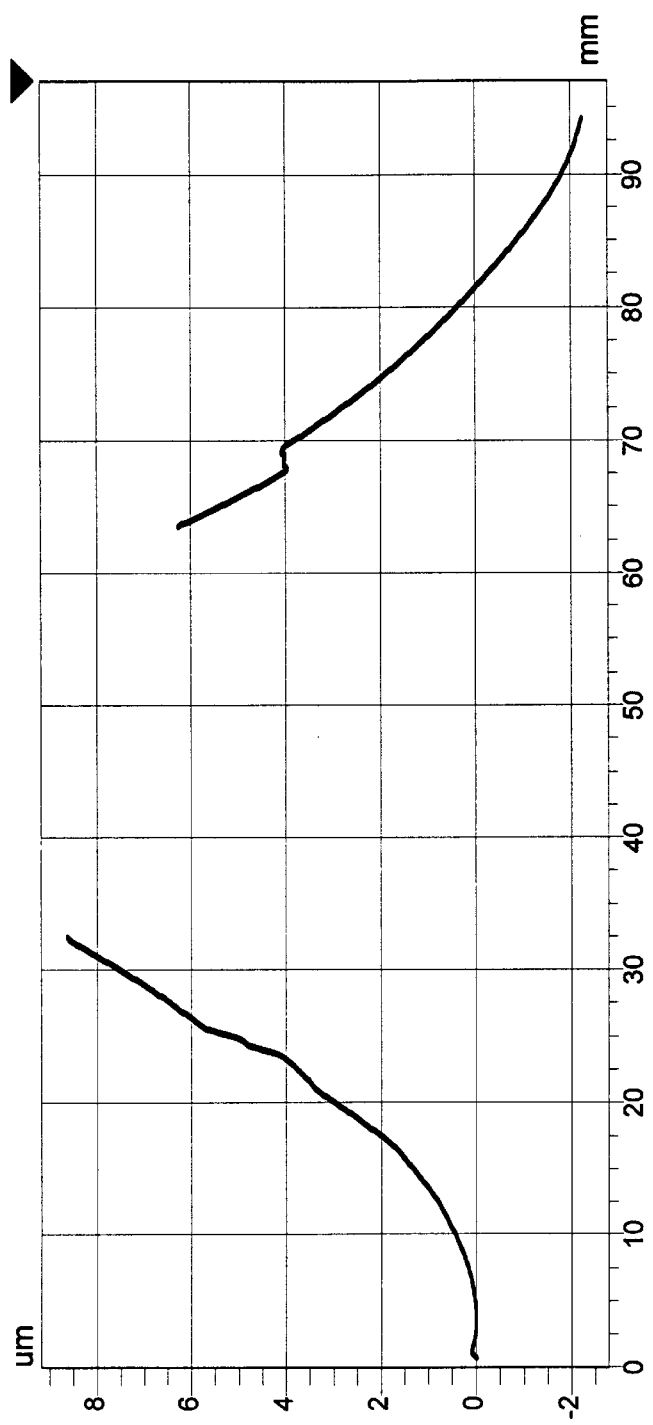
FIG. 21C illustrates the y profile of the height measurements of FIG. 21A through the center portion of the disk, showing the discontinuities corresponding to the center hole.
Figure 22A:
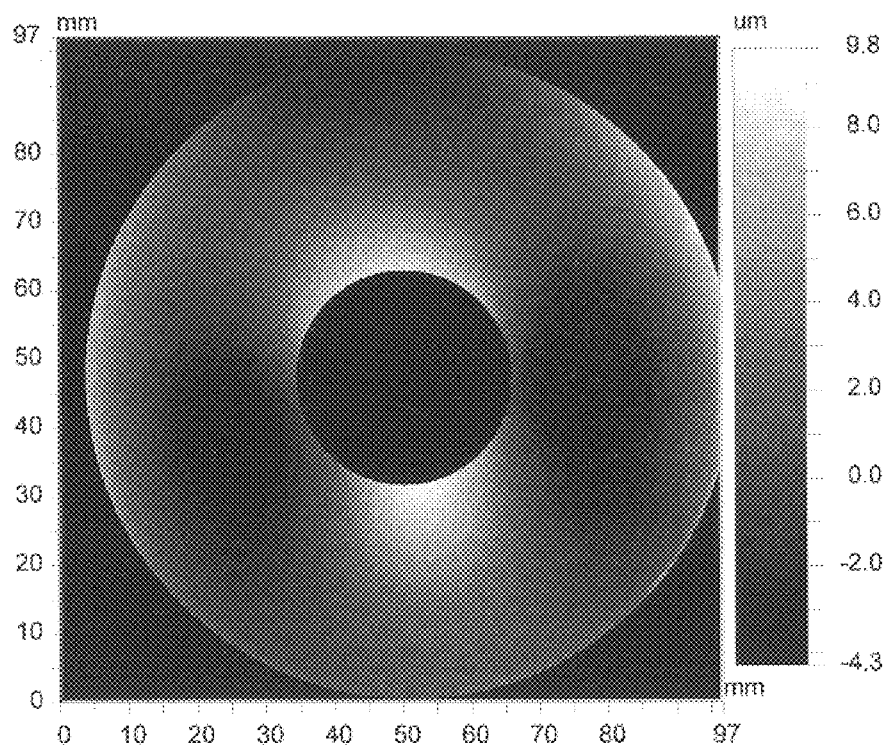
FIG. 22A is the height map of the same optical disk of FIG. 21A derived from data combined according to the stitching method of FIG. 3 selected sequentially according to the process of FIG. 20.
Figure 22B:
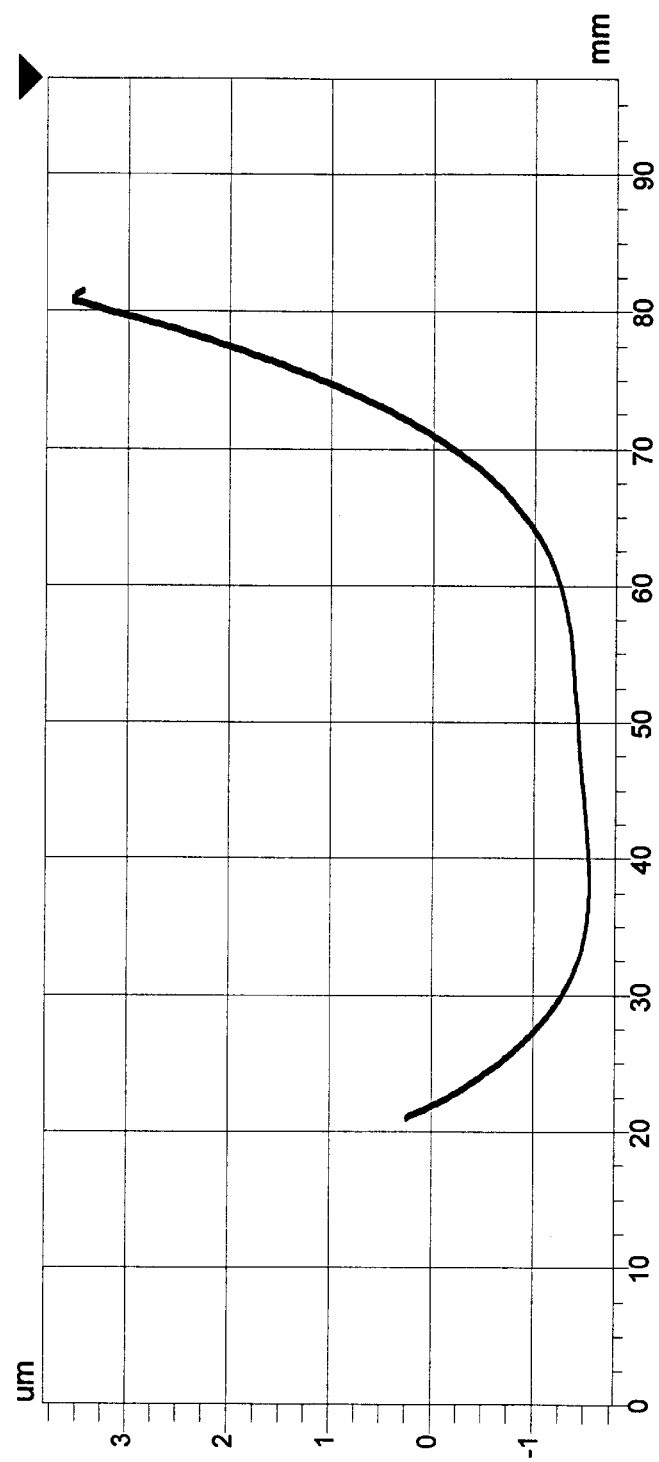
FIG. 22B is the x profile of the height measurements of FIG. 22A through the top portion of the disk, showing a smooth profile as expected and seen in the map.
Figure 22C:
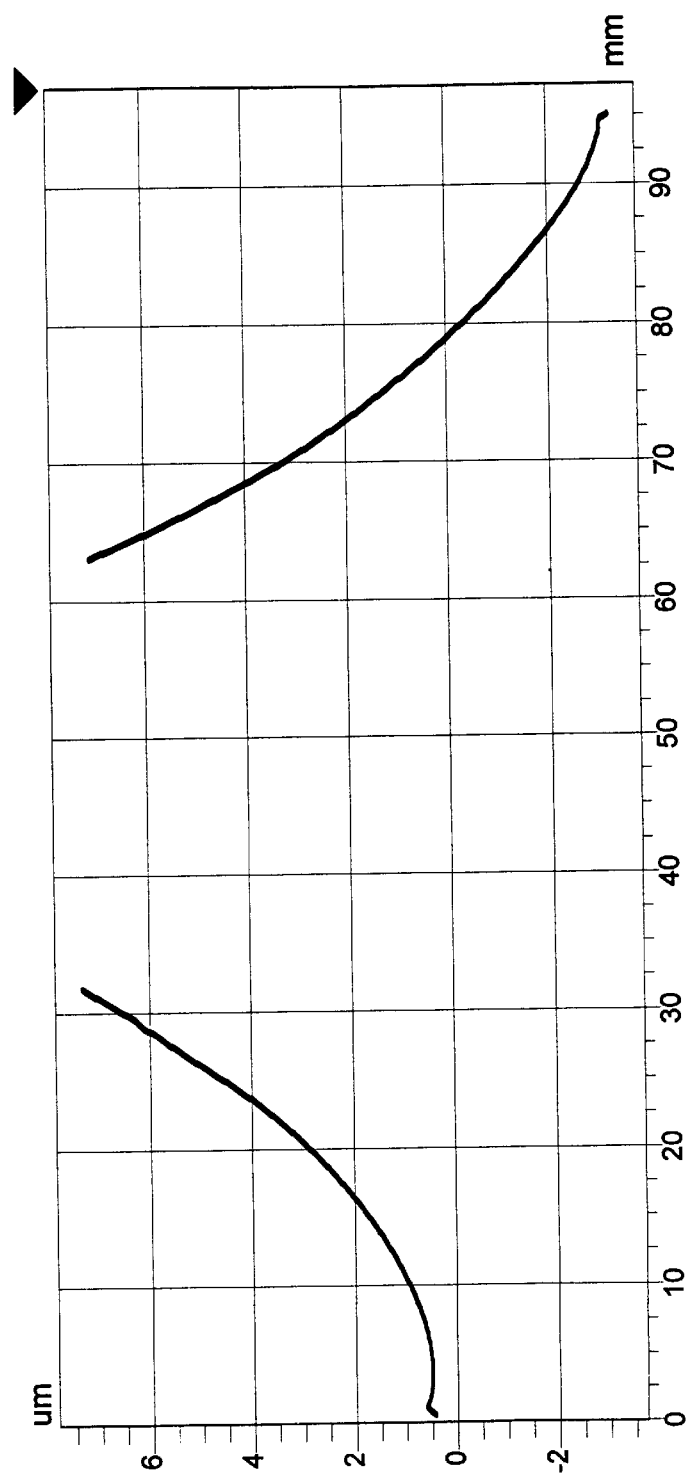
FIG. 22C is the y profile of the height measurements of FIG. 22A through the center portion of the disk, again showing the discontinuity corresponding to the center hole.

The positive effects of this approach in the selection of successive sets of data during the stitching process is illustrated in FIGS. 21 and 22. FIGS. 21B and 21C show the x and y profiles, respectively, of an optical disk surface comprising 250 data sets of measurements stitched together sequentially row by row. The corresponding composite map is shown in FIG. 21A. The x profile illustrates the kind of problem that the approach normally followed in the art for combining multiple data set can produce. (That is, as followed here, the natural and typical approach involves starting with the data set for one corner of the sample surface, proceeding along a row or column to the end and then shifting by one row or column and continuing until all sets are combined). FIG. 21B shows a step that is known not to exist in the disk and is not as apparent in the map of FIG. 21A. By contrast, when the process of stitching is carried out using the selection method of the invention, as illustrated in FIG. 22, the same data produce the much improved x profile seen in FIG. 22B. Some improvement is also seen in the y profile of FIG. 22C.

Thus, the selection procedure of the invention provides an approach that greatly improves stitching of multiple data sets corresponding to overlapping adjacent sections of a sample surface. Although only tested with the stitching method described herein, it is expected that this selection procedure would similarly improve the results obtained with any method of combining data sets corresponding to overlapping surface sections. Therefore, the invention should not be limited to this application.

The procedure is easily computerized for automated applications because each step requires computations and comparisons that can be readily programmed and incorporated into the stitching software. Similarly, it is clear that the procedure so described could be obviously modified by those skilled in the art to include refinements that have been ignored in this disclosure. For example, as mentioned above, the definition of an adjacent pixel could be modified to reflect different pixel arrangements and/or geometries of the light detector. These modifications would produce equivalent methods that would require corresponding adjustments in the computer program utilized to implement them. Thus, it is understood that many equivalent systems are possible within the scope of the present invention and that those skilled in the art could easily design a special system for a specific type of detector array and x-y translation system.

Therefore, various changes in the details and steps that have been described may be made by those skilled in the art within the principles and scope of the invention herein illustrated and defined in the appended claims. While the present invention has been shown and described herein in what is believed to be the most practical and preferred embodiment, it is recognized that departures can be made therefrom within the scope of the invention, which is not to be limited to the details disclosed herein, but is to be accorded the full scope of the claims so as to embrace any and all equivalent apparatus and methods.

We claim:

1. In a stitching procedure for combining a plurality of height profiles corresponding to a plurality of adjacent measured sections of a test surface to produce a composite profile of the surface, wherein said profiles are obtained by multiple interferometric measurements using an objective with a predetermined field of view such that each measured section has a region of overlap with another measured section, and wherein the profiles are combined in each of a sequence of iterations by sequentially stitching pairs of profiles corresponding to adjacent sections of the test surface, the process of selecting said pairs of profiles at each of said iterations comprising the following steps:

(a) selecting one of the measured sections as a reference section;

(b) identifying all sections adjacent to said reference section and determining a number of valid pixels in each region of overlap between said reference section and said sections adjacent thereto;

(c) identifying a region of overlap with a largest number of valid pixels among the regions considered in step (b);

(d) combining a height profile corresponding to an adjacent section having said region of overlap with a largest number of valid pixels with a height profile corresponding to said reference section, thereby producing a composite profile and a corresponding composite section of the test surface;

(e) identifying all sections adjacent to said composite section and determining a number of valid pixels in each region of overlap between said composite section and said sections adjacent thereto;

(f) identifying a region of overlap with a largest number of valid pixels among the regions considered in step (e);

(g) combining a height profile corresponding to an adjacent section having said region of overlap with a largest number of valid pixels, identified in step (f), with the composite profile corresponding to said composite section, thereby producing an expanded composite profile and a corresponding expanded composite section of the test surface; and (h) repeating steps (e)–(g) until all of said plurality of height profiles have been stitched to produce a composite profile of the test surface.

2. The process described in claim 1, wherein said regions of overlap between adjacent sections comprise at least 20 percent of each section.

3. The process described in claim 1, wherein each of said adjacent sections of a test surface comprises a substantially rectangular section of the test surface containing a set of pixels corresponding to a matrix of measured heights.

4. The process described in claim 2, wherein each of said adjacent sections of a test surface comprises a substantially rectangular section of the test surface containing a set of pixels corresponding to a matrix of measured heights.

5. The process described in claim 1, wherein said regions of overlap between adjacent sections are substantially equal in size in each direction of translation of said objective.

6. The process described in claim 2, wherein said regions of overlap between adjacent sections are substantially equal in size in each direction of translation of said objective.

7. The process described in claim 3, wherein said regions of overlap between adjacent sections are substantially equal in size in each direction of translation of said objective.

8. The process described in claim 4, wherein said regions of overlap between adjacent sections are substantially equal in size in each direction of translation of said objective.

9. The process described in claim 1, wherein said reference section is selected among the measured sections based on the largest number of valid pixels.

10. The process described in claim 9, wherein said regions of overlap between adjacent sections comprise at least 20 percent of each section.

11. The process described in claim 9, wherein each of said adjacent sections of a test surface comprises a substantially rectangular section of the test surface containing a set of pixels corresponding to a matrix of measured heights.

12. The process described in claim 10, wherein each of said adjacent sections of a test surface comprises a substantially rectangular section of the test surface containing a set of pixels corresponding to a matrix of measured heights.

13. The process described in claim 9, wherein said regions of overlap between adjacent sections are substantially equal in size in each direction of translation of said objective.

14. The process described in claim 10, wherein said regions of overlap between adjacent sections are substantially equal in size in each direction of translation of said objective.

15. The process described in claim 11, wherein said regions of overlap between adjacent sections are substantially equal in size in each direction of translation of said objective.

16. The process described in claim 12, wherein said regions of overlap between adjacent sections are substantially equal in size in each direction of translation of said objective.

* * * * *